US011324230B2

(12) United States Patent
Behringer et al.

(10) Patent No.: US 11,324,230 B2
(45) Date of Patent: May 10, 2022

(54) FOOD COMPOSITION

(71) Applicant: SOCIETE DES PRODUITS NESTLE S.A., Vevey (CH)

(72) Inventors: Reinhard Behringer, Lausanne (CH); Mathieu Julien Destribats, Lutry (CH); Cedric Dubois, Lavigny (CH); Marina Dupas-Langlet, Savigny (CH); Vincent Daniel Maurice Meunier, Epalinges (CH); Joydeep Ray, Epalinges (CH); Andrew Steven Whitehouse, North Yorkshire (GB)

(73) Assignee: Societe des Produits Nestle S.A., Vevey (CH)

( * ) Notice: Subject to any disclaimer, the term of this patent is extended or adjusted under 35 U.S.C. 154(b) by 166 days.

(21) Appl. No.: 16/620,261

(22) PCT Filed: Jun. 6, 2018

(86) PCT No.: PCT/EP2018/064881
§ 371 (c)(1),
(2) Date: Dec. 6, 2019

(87) PCT Pub. No.: WO2018/224541
PCT Pub. Date: Dec. 13, 2018

(65) Prior Publication Data
US 2021/0092973 A1    Apr. 1, 2021

(30) Foreign Application Priority Data
Jun. 7, 2017  (EP) .................................. 17174757

(51) Int. Cl.
*A23D 7/005*    (2006.01)
*A23D 7/02*    (2006.01)
(Continued)

(52) U.S. Cl.
CPC ............. *A23D 7/0056* (2013.01); *A23D 7/02* (2013.01); *A23D 9/007* (2013.01); *A23G 1/36* (2013.01)

(58) Field of Classification Search
CPC .......... A23V 2002/00; A23V 2200/132; A23V 2200/3322; A23D 7/0056; A23D 7/02; A23D 9/007; A23G 1/36
(Continued)

(56) References Cited

U.S. PATENT DOCUMENTS

2010/0136182 A1 *  6/2010  Rabault .................. A21D 13/28
426/94

FOREIGN PATENT DOCUMENTS

WO    2006005525        1/2006
WO    WO-2006005525 A1 *  1/2006 ............... A23C 9/18
(Continued)

OTHER PUBLICATIONS

Adhikari et al. "Effect of addition of proteins on the production of amorphous sucrose powder through spray drying" Journal of Food Engineering, 2009, vol. 94, pp. 144-153.

*Primary Examiner* — Deborah D Carr
(74) *Attorney, Agent, or Firm* — K&L Gates LLP

(57) ABSTRACT

The present invention relates to food compositions, in particular soft food compositions comprising amorphous porous particles, the amorphous porous particles comprising sweetener, bulking agent and surfactant. Further aspects of the invention relate to a spread having an enhanced sweetness perception and a process for manufacturing a food composition having a soft texture.

17 Claims, 7 Drawing Sheets

(51) Int. Cl.
*A23D 9/007* (2006.01)
*A23G 1/36* (2006.01)
(58) Field of Classification Search
USPC .......................................................... 426/601
See application file for complete search history.

(56) References Cited

FOREIGN PATENT DOCUMENTS

| WO | 2012050439 | 4/2012 | | |
|---|---|---|---|---|
| WO | WO-2012050439 A1 | * | 4/2012 | ............... A23L 9/20 |

* cited by examiner

I

J

K

L

M

N

O

P

Q

R

S

FOOD COMPOSITION

CROSS REFERENCE TO RELATED APPLICATIONS

The present application is a National Stage of International Application No. PCT/EP2018/064881, filed on Jun. 6, 2018, which claims priority to European Patent Application No. 17174757.9, filed on Jun. 7, 2017, the entire contents of which are being incorporated herein by reference

FIELD OF THE INVENTION

The present invention relates to food compositions, in particular soft food compositions comprising porous particles having an amorphous continuous phase. Further aspects of the invention relate to a spread having an enhanced sweetness perception and a process for manufacturing a food composition having a soft texture.

BACKGROUND OF THE INVENTION

The increasing interest in reduced sugar intake in the diet by health conscious consumers has led to a strong demand for food products with lower amounts of sugar. Sugar, however, is a key food ingredient that in addition to imparting natural sweetness to food products also functions to provide bulk and therefore plays a significant role in the structure, volume and mouthfeel of the finished food product.

Sucrose is a naturally occurring sugar sweetener that provides the sweetness in food products that consumers crave but is also highly calorific and so there is an important need for healthier, non-caloric or low-caloric sweetener alternatives. There have been many approaches that are well known in the art, involving the replacement or reduction of sugars in food products such as for instance using artificial sweeteners or sugar alcohols to replace natural sugar (sucrose). Other approaches have included using bulking agents such as, no- or low-caloric fibres to replace sucrose. These approaches however, have associated disadvantages, for instance many sugar alcohols are known to have undesirable laxative effects and furthermore artificial sweeteners are not well perceived by consumers who have a preference for clean label products. There are also certain disadvantages linked to the use of bulking agents to replace sucrose in food products this is mainly the associated undesirable impact on sweetness usually a reduction in sweetness.

Thus, it is generally well known to those skilled in the art of food manufacturing that replacing or reducing sugar in a food composition usually negatively impacts the flavour, and other taste components. For instance, sugar replacers may be slower in onset of the sweetness perception and longer in duration compared to natural sugar and so therefore change the taste balance of a food composition.

In addition sugar replacers may not deliver as sweet a taste as natural sugar and may also exhibit, metallic, cooling, astringent, liquorice-like, and bitter after tastes.

Aerated compositions are of particular interest to the food industry, having the potential to provide new textures and sensory properties. There is increasing concern about the amount of fat consumed in people's diet. Incorporating air into fat-containing materials provides a method to maintain product volume whilst reducing the fat content.

There is a need in the industry to provide sweet tasting food compositions with lower levels of sugar without having a detrimental impact on the sweetness perception and/or any of the above associated problems of the prior art solutions. It would be desirable if such food compositions contained ingredients that consumers were familiar with, and were free from artificial sweeteners.

An object of the present invention is to improve the state of the art and to provide an improved solution to overcome at least some of the inconveniences described above or at least to provide a useful alternative. Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The object of the present invention is achieved by the subject matter of the independent claims. The dependent claims further develop the idea of the present invention.

SUMMARY OF THE INVENTION

Accordingly, the present invention provides in a first aspect a food composition having a soft texture at 20° C., the food composition comprising a dispersion of porous particles in a continuous fat phase wherein the particles comprise an amorphous continuous phase comprising a sweetener, a bulking agent and optionally a surfactant. In a second aspect the invention relates to a spread having the same sweetness as a control spread, the control having a sucrose content between 40 and 65%, but wherein the sucrose content has been reduced by at least 20% compared to the control, and wherein the spread contains no mono, di or tri-saccharides apart from sucrose or lactose and contains no sugar alcohols or high intensity sweeteners. In a third aspect the invention relates to a process for manufacturing a food composition having a soft texture at 20° C., the process comprising the steps of a) subjecting a mixture comprising sweetener, bulking agent and optionally a surfactant to high pressure; b) adding gas to the mixture; c) spraying and drying the mixture to form porous particles comprising a continuous amorphous phase; and d) mixing the particles with fat.

It has been surprisingly found by the inventors that by preparing a soft food composition such as a confectionery filling or spread using amorphous porous particles comprising sweetener, bulking agent and surfactant, the overall level of sweetener (e.g. sucrose) can be reduced without having a detrimental effect on the sweetness of the filling or spread. At equivalent volumes, the aerated amorphous porous particles gave at least equivalent sweetness compared to conventional crystalline sucrose. Thus, the porous particles according to the composition of the present invention may provide a reduction of sugar content without the need to use artificial sweeteners (for example high-intensity sweeteners) and/or without the need to use materials such as silica or cellulose.

Without being bound by theory it is believed that porous particles comprising sweetener (for example sucrose) in the amorphous state and having porosity (particularly internal closed porosity) provide a material which dissolves more rapidly than crystalline sugar particles of a similar size. This rapid dissolution in the oral cavity when consumed leads to an enhanced sweetness perception and ensures that more of the sugar is dissolved and reaches the tongue rather than being swallowed untasted.

The porous nature of the particles serves to aerate the filling or spread reducing its density. The aeration from the amorphous porous particles is stable against heat damage. In contrast, conventional air bubbles directly in the fat phase of soft fat-based materials such as fillings or spreads are very susceptible to the fat melting. Aeration volume is often lost if the filling or spread is subjected to one or more heat cycles.

Porous particles comprising an amorphous continuous phase according to the composition of the present invention overcome the problems normally associated with amorphous sugar based powder materials and can, contrary to known amorphous sugar based materials, be used in fat-based filling or spread compositions, for example. So for example, because of the hygroscopic nature and so its water content amorphous sugar is not typically used in such compositions. It undesirably absorbs water from the environment and other ingredients present leading to undesirable increases in viscosity. Furthermore the amorphous state can be unstable, and amorphous sugars, such as sucrose or dextrose, tend to rapidly crystallise in the presence of moisture and/or release moisture from crystallisation. Amorphous porous particles comprising sweetener, bulking agent and surfactant have been found to be more moisture-stable than simple amorphous sugars.

The presence of surfactant allows the formation of particles with high porosity, and a porous structure which is able to resist the physical forces applied during processing of compositions such as fillings and spreads and still retain at least some of its porosity.

DETAILED DESCRIPTION OF THE INVENTION

Figure 1:
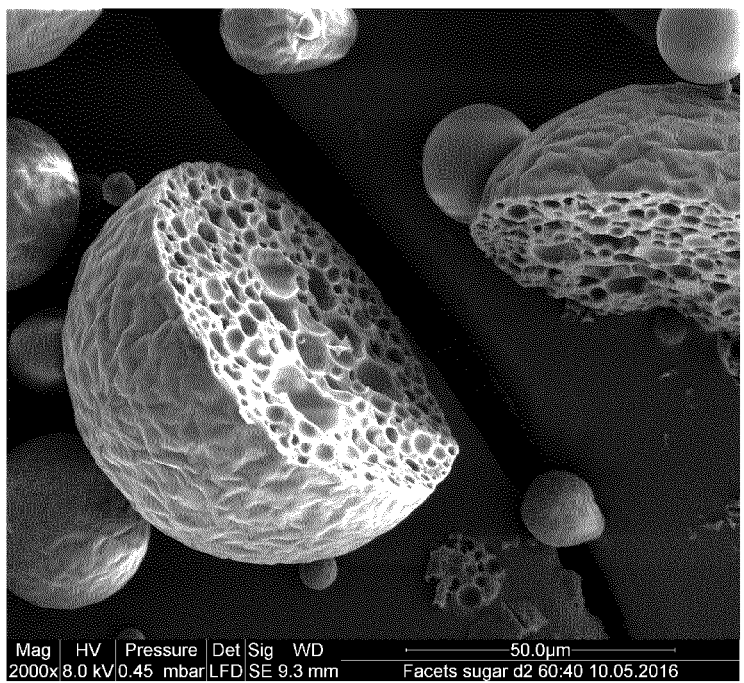
FIG. 1 shows a scanning electron micrograph of a sample of the skimmed milk and sucrose amorphous porous particles formed in example 1. The particle has been fractured during preparation.

Consequently the present invention relates in part to a food composition having a soft texture at 20° C., the food composition comprising a dispersion of porous particles in a continuous fat phase wherein the particles comprise an amorphous continuous phase comprising a sweetener, a bulking agent and optionally a surfactant (for example wherein the texture of the food composition is such that it exhibits a maximum penetration force of less than 1500 g at 20° C.). Soft textured food compositions include confectionery fillings and spreads. Spreads and fillings may be very soft, for example having a maximum penetration force of between 10 and 60 g at 20° C. Fillings have a wider range of texture and may have a maximum penetration force of between 10 and 1500 g at 20° C. A material having a soft texture may be considered to be a material having a maximum penetration force of less than 1500 g at 20° C., for example less than 1000 g at 20° C., for further example less than 500 g, for further example less than 100 g, for further example less than 60 g. The maximum penetration force may for example be measured using a 60° conical probe. Conical probes are suitable for soft materials. A conical probe may cause a hard material to fracture before completing the measurement. Hard materials such as chocolate would generally have a penetration force above 3000 g at 20° C. Cylindrical probes are more suitable for hard materials.

In the context of the present invention, the term fat refers to triglycerides. Fats are the chief component of animal adipose tissue and many plant seeds. Fats which are generally encountered in their liquid form are commonly referred to as oils. In the present invention the terms oils and fats are interchangeable. The melting point of a fat may for example be the temperature at which it has a 1% solid fat content as measured by pulsed NMR.

The fat content of the food composition of the invention may be between 15 and 70 wt. % fat, for example between 20 and 50 wt. % fat, for further example between 25 and 35 wt. % fat.

Porous particles comprising an amorphous continuous phase may be present in the food composition of the invention at a level of between 2 and 40 wt. %, for example between 5 and 35 wt. %, for further example between 10 and 30 wt. %.

According to the present invention the term 'amorphous' as used herein is defined as being a glassy solid, essentially free of crystalline material.

According to the present invention the term glass transition temperature (Tg) as used herein is to be interpreted as is commonly understood, as the temperature at which an amorphous solid becomes soft upon heating. The glass transition temperature is always lower than the melting temperature (Tm) of the crystalline state of the material. An amorphous material can therefore be conventionally characterised by a glass transition temperature, denoted Tg. A material is in the form of an amorphous solid (a glass) when it is below its glass transition temperature.

Several techniques can be used to measure the glass transition temperature and any available or appropriate technique can be used, including differential scanning calorimetry (DSC) and dynamic mechanical thermal analysis (DMTA)

In an embodiment of the present invention the amorphous continuous phase of the porous particles is characterised as having a glass transition temperature of 40° C. or higher, for example 50° C. or higher and for further example 60° C. or higher.

In an embodiment of the present invention the food composition exhibits a maximum penetration force of between 10 and 1500 g (for example between 15 and 100 g, for further example between 15 and 60 g) at 20° C. as measured using a 60° conical probe.

Advantageously in contrast to prior art solutions, the amorphous continuous phase of the porous particles of the present invention is less hygroscopic making such material easier to handle and incorporate into conventional preparations of foodstuffs such as for example fillings and spreads.

According to the present invention the term porous as used herein is defined as having multiple small pores, voids or interstices, for example of such a size to allow air or liquid to pass through. In the context of the present invention porous is also used to describe the aerated nature of the particles of the present invention.

In the present invention the term porosity as used herein is defined as a measure of the empty spaces (or voids or pores) in a material and is a ratio of the volume of voids to total volume of the mass of the material between 0 and 1, or as a percentage between 0 and 100%

Porosity can be measured by means known in the art. For instance, the particle porosity can be measured by the following equation:

Porosity=$Vp-Vcm/Vp\times100$ wherein $Vp$ is the Volume of the particle and $Vcm$ is the volume of the matrix or bulk material.

According to the present invention the term closed or internal porosity as used herein refers in general terms to the total amount of void or space that is trapped within the solid. As can be seen in FIG. 1, fragmented amorphous porous particles of the present invention show the internal micro structure wherein the voids or pores are not connected to the outside surface of the said particles. In the present invention the term closed porosity is further defined as the ratio of the volume of closed voids or pores to the particle volume.

Increasing the porosity of the particles increases their dissolution speed in water (see Example 4). This increased dissolution speed enhances the sweetness impact of the particles. However, increasing the porosity of the particles also increases their fragility. It is advantageous that the porous particles according to the present invention exhibit closed porosity. Particles with closed porosity, especially those with many small spherical pores, are more robust than particles with open pores, as the spherical shapes with complete walls distribute any applied load evenly. When added to a soft food composition with a fat-continuous phase, closed porosity has a further advantage over open porosity in that fat does not penetrate inside the particle. This penetration inside the particles would reduce the "free" fat available to coat all the particles in the composition and lead to an increase in viscosity.

The porous particles comprised within the food composition of the invention may have a closed porosity of between 10 to 80%, for example between 15 and 70%, for further example between 20 and 60%.

The porous particles according to the invention may have a normalized specific surface of between 0.10 and 0.18 m$^{-1}$, for example between 0.12 and 0.17 m$^{-1}$. The porous particles according to the invention may have a normalized specific surface of between 0.10 and 0.18 m$^{-1}$ (for example between 0.12 and 0.17 m$^{-1}$) and a particle size distribution D90 of between 30 and 140 microns (for example between 40 and 90 microns).

$$\text{Normalized specific surface} = \frac{\text{interstitial surface area of pores} + \text{external surface area of material}}{\text{solid volume of material}}$$

According to the present invention the term density is the mass per unit volume of a material. For porous powder, three terms are commonly used; apparent density, tap density and absolute density. Apparent density (or envelope density) is the mass per unit volume wherein pore spaces within particles are included in the volume. Tap density (or bulk density) is the density obtained from filling a container with the sample material and vibrating it to obtain near optimum packing. Tap density includes inter-particle voids in the volume whereas apparent density does not. In absolute density (or matrix density), the volume used in the density calculation excludes both pores and void spaces between particles.

In an embodiment of the present invention the porous particles according to the composition of the present invention have an apparent density of between 0.3 to 1.5 g/cm$^3$, for example between 0.5 and 1.0 g/cm$^3$, for further example between 0.6 and 0.9 g/cm$^3$.

As previously described, the amorphous and porous nature of the particles leads to faster dissolution in the mouth. This not only enhances sweetness impact but is believed to make the particles less easily detected by the tongue and palate. Advantageously the highly porous and amorphous nature of the particles of the present invention provides an enhanced sweetness and attractive mouthfeel, particularly in fat based fillings and spreads where replacing sucrose with conventional bulking agents usually leads to poor organoleptic qualities, such as grittiness and lack of sweetness.

The D90 value is a common method of describing a particle size distribution. The D90 is the diameter where 90% of the mass of the particles in the sample have a diameter below that value. In the context of the present invention the D90 by mass is equivalent to the D90 by volume. The D90 value may be measured for example by a laser light scattering particle size analyser. Other measurement techniques for particle size distribution may be used depending on the nature of the sample. For example, the D90 value of powders may conveniently be measured by digital image analysis (such as using a Camsizer XT) while the D90 value of particles comprised within a fat continuous material such as chocolate may be measured by laser light scattering.

The porous particles comprised within the composition of the present invention may have a particle size distribution D90 below 450 microns, for example below 140 microns, for further example between 30 and 140 microns. The porous particles comprised within the beverage powder of the invention may have a particle size distribution D90 of less than 90 microns, for example less than 80 microns, for further example less than 70 microns. The porous particles comprised within the beverage powder of the invention may have a particle size distribution D90 of between 40 and 90 microns, for example between 50 and 80 microns.

The porous particles comprised within the composition of the present invention may be approximately spherical, for example they may have a sphericity of between 0.8 and 1. Alternatively, the particles may be non-spherical, for example they may have been refined, for example by roll refining.

The porous particles comprised within the composition of the present invention may be obtained by foam drying, freeze drying, tray drying, fluid bed drying and the like. Preferably the porous particles are obtained by spray drying with pressurized gas injection.

The spray in a spray drier produces droplets that are approximately spherical and can be dried to form approximately spherical particles. However, spray driers are typically set to produce agglomerated particles, as agglomerated powders provide advantages as ingredients in terms of flowability and lower dustiness, for example an open top spray drier with secondary air recirculation will trigger particle agglomeration. The agglomerated particles may have a particle size distribution D90 of between 120 and 450 µm. The size of spray-dried particles with or without agglomeration may be increased by increasing the aperture size of the spray-drying nozzle (assuming the spray-drier is of sufficient size to remove the moisture from the larger particles). The porous particles comprised within the composition of the invention may comprise un-agglomerated particles, for example at least 80 wt. % of the amorphous porous particles comprised within the composition of the invention may be un-agglomerated particles. The porous particles comprised within the composition of the invention may be agglomerated particles which have been refined.

Advantageously, the harsh processing conditions of the confectionery filling and fat-based spread manufacturing such as refining does not destroy the porosity of the particles of the present invention, for example the particle size of agglomerated particles described above could be reduced by roller refining whilst still retaining much of their original closed porosity. For example, after refining the particles may retain at least 20%, 30%, 40% or 50% of their initial closed porosity, for further example the particles after refining may have a closed porosity between 20 and 60%.

When formed into agglomerates, the agglomerated particles generally retain convex rounded surfaces composed of the surfaces of individual spherical particles. Refining spherical or agglomerated spherical particles causes fractures in the particles which leads to the formation of non-rounded surfaces. The refined particles according to an embodiment of the invention may have less than 70% of their surface being convex, for example less than 50%, for further example less than 25%.

After refining, less than 30% of the particles may be substantially spherical, for example less than 20% may be substantially spherical, for example less than 10% may be substantially spherical, for example less than 5% may be substantially spherical, for example essentially none of the particles may be substantially spherical. According to the present invention the term sphericity as used herein refers to in conventional terms a measure of how spherical (round) an object is. In the context of the present invention sphericity refer to the sphericity of the particles and is defined as Sphericity=4 $\pi A/P^2$ wherein $A$ is defined as the measured area covered by a particle projection and $P$ is the measured perimeter of a particle projection.

For instance, an ideal sphere would have an expected the sphericity of 1. It is to be commonly understood however that a high degree of sphericity can still be achieved with values less than 1. For example a value between 0.6 and 1 for an object or particle would be considered substantially spherical.

Imaging experiments show clearly that the particles comprised within the composition of the present invention retain significant porosity after the filling or spread preparation steps. Sensory evaluations performed showed good tasting qualities and light and creamy texture and mouthfeel indicative of particle porosity remaining intact within the product.

The use of spherical particles in a fat-continuous system allows a lower fat contents to be used without increasing viscosity. Spherical particles allow higher packing fractions than irregularly shaped particles due to reduced steric interactions between the particles. For the same particle-size distribution and fat content, spherical particles provide a smoother mouth-feel. However, even when refined, the porous amorphous particles according to the composition of the invention dissolve rapidly and so are less noticeable in the mouth than the equivalently sized crystalline material.

The porous particles comprised within the composition of the invention may comprise sweetener, bulking agent and surfactant, all distributed throughout the continuous solid phase of the particles. Higher concentrations of surfactant may be present at the gas interfaces than in the rest of the continuous phase, but the surfactant is in the continuous phase inside the particles, not just coated onto the exterior. For example, the surfactant may be present in the interior of the particles according to the composition of the invention.

According to the present invention the term sweetener as used herein refers to substance which provides a sweet taste. The sweetener may be a sugar, for example a mono, di or oligo-saccharide. The sweetener may be selected from the group consisting of sucrose, fructose, glucose, dextrose, galactose, allulose, maltose, high dextrose equivalent hydrolysed starch syrup, xylose, and combinations thereof. Accordingly, the sweetener comprised within the amorphous porous particles according to the invention may be selected from the group consisting of sucrose, fructose, glucose, dextrose, galactose, allulose, maltose, high dextrose equivalent hydrolysed starch syrup xylose, and any combinations thereof. The sweetener may be sucrose.

In a preferred embodiment the porous particles according to the present invention comprise sweetener (for example sucrose) in the amount of 5 to 70%, preferably 10 to 50%, even more preferably 20 to 40%.

In one preferred embodiment the porous particles according to this invention comprise at least 70% sweetener (for example sucrose).

According to the present invention the term bulking agent refers to a food ingredient that increases food volume or weight without significantly impacting flavour. The bulking agent according to the present invention may be a material which increases food volume or weight without impacting the utility or functionality of a food. In an embodiment of the present invention, the bulking agents of the present invention are low or non-calorific additives which impart bulk and provide advantageously healthier alternatives to for example sucrose. The bulking agent may be a biopolymer, for example a sugar alcohol, saccharide oligomer or polysaccharide. In an embodiment, the bulking agent may be a sugar alcohol, saccharide oligomer or polysaccharide which is less sweet than crystalline sucrose on a weight basis.

In an embodiment, the porous particles of the present invention comprise a bulking agent in the amount of 5 to 70%, for example 10 to 40%, for further example 10 to 30%, for still further example 40 to 70%.

In one embodiment, the porous particles of the present invention comprise 10 to 25% of the bulking agent.

According to the present invention the bulking agent may be selected from the group consisting of sugar alcohols (for example isomalt, sorbitol, maltitol, mannitol, xylitol, erythritol and hydrogenated starch hydrolysates), lactose, maltose, fructo-oligosaccharides, alpha glucans, beta glucans, starch (including modified starch), natural gums, dietary fibres (including both insoluble and soluble fibres), polydextrose, methylcellulose, maltodextrins, inulin, dextrins such as soluble wheat or corn dextrin (for example Nutriose®), soluble fibre such as Promitor® and any combination thereof.

In an embodiment of the present invention the bulking agent may be selected from the group consisting of lactose, maltose, maltodextrins, soluble wheat or corn dextrin (for example Nutriose®), polydextrose, soluble fibre such as Promitor® and any combinations thereof.

The porous particles according to the invention may have a moisture content between 0.5 and 6 wt. %, for example between 1 and 5 wt. %, for further example between 1.5 and 3 wt. %.

The surfactant comprised within the particles according to the composition of the invention aids the formation of porosity, in particular closed porosity. In an embodiment, the amorphous porous particles of the present invention comprise a surfactant in the amount of 0.5 to 15 wt. %, for example 1 to 10 wt. %, for further example 1 to 5 wt. %, for further example 1 to 3 wt. %.

According to the present invention the surfactant may be selected from the group consisting of lecithin, whey proteins, milk proteins, non-dairy proteins, sodium caseinate, lysolecithin, fatty acid salts, lysozyme, sodium stearoyl lactylate, calcium stearoyl lactylate, lauroyl arginate, sucrose monooleate, sucrose monostearate, sucrose monopalmitate, sucrose monolaurate, sucrose distearate, sorbitan monooleate, sorbitan monostearate, sorbitan monopalmitate, sorbitan monolaurate, sorbitan tristearate, PGPR, PGE and any combinations thereof.

In an embodiment of the present invention the surfactant may be sodium caseinate or lecithin.

In embodiments according to the present invention wherein the bulking agent is derived from milk powder such as skimmed milk powder, sodium caseinate is inherently present. In embodiments according to the present invention wherein the bulking agent is whey powder, whey protein is inherently present.

The surfactant according to the composition of the invention may be a non-dairy protein. In the context of the present invention the term "non-dairy proteins" refers to proteins that are not found in bovine milk. The primary proteins in bovine milk are caseins and whey proteins. Some consumers desire to avoid milk proteins in their diets, for example they may suffer from milk protein intolerance or milk allergy and so it is advantageous to be able to offer food products free from dairy proteins. The non-dairy protein comprised within the particles of the invention may act as a surfactant, promoting the formation of a porous structure within the particles and stabilising the structure during processing. The non-dairy protein may enhance the formation of particles with closed porosity, in particular multiple internal pores which are spherical or nearly spherical in shape and are resistant to being ruptured during processing of the particles. The non-dairy protein comprised within the particles of the invention may be selected from the group consisting of pea proteins, potato proteins, almond proteins, hazelnut proteins, wheat gluten, oat protein, egg albumin proteins (for example ovalbumin, ovotransferrin, ovomucoid, ovoglobulin, ovomucin and/or lysozyme), clupeine, soy proteins, tomato proteins, Brassicaceae seed protein and combinations of these. For example the non-dairy protein comprised within the particles of the invention may be selected from the group consisting of pea proteins, almond proteins, wheat gluten, soy proteins, and combinations of these.

In an embodiment, the porous particles of the present invention comprise a non-dairy protein in the amount of 0.5 to 15%, preferably 1 to 10%, more preferably 1 to 5%, even more preferentially 1 to 3%.

The porous particles may comprise (for example consist on a dry basis of) sucrose, soluble fibre and a plant protein selected from the group consisting of pea protein, wheat gluten, almond protein, coconut protein and soy protein (for example wheat gluten or almond protein), the sucrose being present at a level of at least 30% in the particles, the ratio of sucrose to soluble fibre being between 0.5 to 1 and 2.5 to 1 on a dry weight basis, for example between 0.6 to 1 and 1.7 to 1 on a dry weight basis. The porous particles may comprise (for example consist on a dry basis of) sucrose, soluble fibre and a plant protein being wheat gluten or almond protein, the sucrose being present at a level of at least 30% in the particles, the ratio of sucrose to soluble fibre being between 0.5 to 1 and 2.5 to 1 on a dry weight basis, for example between 0.6 to 1 and 1.7 to 1 on a dry weight basis.

The porous particles of the invention may be coated, for example they may be coated in a thin layer of fat such as cocoa butter. A thin layer of fat further enhances the stability of the particles during transport and storage.

The porous nature of the particles of the invention may lead to them being lighter in colour than solid crystalline materials such as sucrose crystals. This can be counteracted by the addition of opaque or coloured materials. The porous particles according to the invention may comprise coloured ingredients, for example caramelized sugars or permitted food colours, for example natural food colours.

The amorphous continuous phase of the porous particles comprised within the composition of the invention may comprise (for example consist on a dry basis of) sucrose and skimmed milk, the sucrose being present at a level of at least 30 wt. % in the particles. The ratio of sucrose to skimmed milk may be between 0.5 to 1 and 2.5 to 1 on a dry weight basis, for example between 0.6 to 1 and 1.5 to 1 on a dry weight basis. The skimmed milk may have a fat content below 1.5 wt. % on a dry weight basis, for example below 1.2 wt. %. The components of skimmed milk may be provided individually and combined with sucrose, for example the amorphous continuous phase of the porous particles of the invention may comprise sucrose, lactose, casein and whey protein. Sucrose and skimmed milk provide an amorphous continuous phase which has good stability against recrystallization without necessarily requiring the addition of reducing sugars or polymers. For example the porous particles of the invention may be free from reducing sugars (for example fructose, glucose or other saccharides with a dextrose equivalent value. The dextrose equivalent value may for example be measured by the Lane-Eynon method). For example the amorphous continuous phase of the porous particles may be free from reducing sugars. For further example the porous particles of the invention (for example the amorphous continuous phase of the particles) may be free from oligo- or polysaccharides having a three or more saccharide units, for example maltodextrin or starch.

The porous particles according to the composition of the present invention may be free from ingredients not commonly used by consumers when preparing food in their own kitchen, in other words, the porous particles of the present invention may consist of so-called "kitchen cupboard" ingredients.

In an embodiment of the composition of the invention where the amorphous continuous phase of the particles comprises (for example consists on a dry basis of) sucrose and skimmed milk, increasing the proportion of skimmed milk to sucrose reduces the amount of sucrose in the overall composition. This can be advantageous, as many consumers would welcome a good tasting filing or spread with reduced sugar, and appreciate a high milk content. Reducing the proportion of sucrose in the particles reduces their sweetness directly, but it also reduces the dissolution speed of the particles which further reduces sweetness impact in the mouth. However, by increasing the porosity of the particles, in particular the closed porosity of the particles, the dissolution speed can be increased so counteracting the reduction of sweetness. The invention may provide a food composition (for example a filling or spread) comprising fat, the composition having a continuous fat phase and comprising 5 to 60% (for example 20 to 55%) of porous particles wherein said porous particles have a moisture content of between 1% and 5% (for example between 2% and 3%), comprise an amorphous continuous phase comprising sucrose and skimmed milk at a level of at least 95% of the particles on a dry basis (for example at least 98%), have a ratio of sucrose to skimmed milk between 0.5:1 and 0.6:1 and have a closed porosity between 20% and 60%, for example between 25% and 50%, for further example between 25% and 40%. The porous particles may have a D90 particle size distribution of between 30 and 140 microns, for example between 40 and 90 microns, for further example between 50 and 80 microns. The food composition may comprise between 30 and 60 wt. % fat, for example between 35 and 50 wt. % fat.

In an embodiment, the food composition of the invention may comprise partially aggregated proteins, for example the porous particles according to the food composition of the invention may comprise partially aggregated protein. The food composition of the invention may comprise between 1 and 30 wt. % partially aggregated proteins. The partially aggregated proteins may comprise proteins selected from the group consisting of soy proteins (for example soy glycinin, for further example conglycinin), egg proteins (for example ovalbumin, for further example ovaglobulins), rice proteins, almond proteins, oat proteins, pea proteins, potato proteins, wheat proteins (for example gluten), milk proteins (for example whey protein, for further example casein) and combinations of these. The partially aggregated proteins may comprise (for example consist of) at least two proteins selected from the group consisting of soy proteins, egg proteins, rice proteins, almond proteins, oat proteins, pea proteins, potato proteins, wheat proteins, casein, whey proteins and combinations of these. The proteins may have been partially aggregated by a heat treatment at a temperature between 65° C. to 100° C. for a period of from 30 seconds to 90 minutes and a pH of between 5.5 and 7.1, for example a heat treatment at a temperature between 85° C. and 100° C. for a period of between 50 and 400 seconds and a pH of between 5.8 and 6.2. The higher the temperature applied the shorter the time required to reach partial aggregation. Heating for too long should be avoided as this fully denatures the proteins leading to them precipitating out as insoluble particles. In an embodiment, the proteins have been partially aggregated by a heat treatment at a temperature between 90° C. and 100° C. for a period of between 30 seconds and 4 minutes at a pH of between 5.5 and 7.1. In an embodiment, the proteins have been partially aggregated by a heat treatment at a temperature between 65° C. and 75° C. for a period of between 10 minutes and 30 minutes at a pH of between 5.5 and 7.1. The partially aggregated proteins may be in the form of protein aggregates dispersed within the amorphous continuous phase of the porous particles. The partially aggregated proteins enhance the smooth and creamy texture of the food composition, for example confectionery filing or spread.

In the context of the present invention the term partially aggregated proteins means that a proportion of the proteins have been aggregated. The content of soluble protein after the aggregation process is preferably below or equal to 30%, preferably below or equal to 20% in relation to the total protein content; the majority of the proteins being embedded in aggregated structures. Partially aggregated particles may form networks. Partially aggregated proteins can bind or entrap water and fat particles to increase viscosity and mouthfeel. Partially aggregated particles may not form insoluble particles for example as protein precipitates.

In an embodiment of the present invention the food composition exhibits a maximum penetration force below 60 g at 20° C. as measured using a 60° conical probe. A maximum penetration force below 60 g is typical of a spread. The food composition may have exhibit a maximum penetration force below 60 g at 20° C. as measured using a 60° conical probe and have a fat content between 20 and 35 wt. %.

The continuous fat phase of the food composition of the invention may comprise (for example consist of) a high melting fat and a low melting fat. In an embodiment, the high melting fat comprised within the continuous fat phase may be selected from the group consisting of stearin or mid-fractions of shea butter, kokum butter, sal butter, cocoa butter, palm oil, algal oil and combinations of these. In an embodiment, the low melting fat comprised within the continuous fat phase may be selected from the group consisting of high oleic sunflower oil, high oleic safflower oil, high oleic soybean oil, high oleic rapeseed oil such as high oleic canola oil, high oleic algal oil, olive oil, macadamia nut oil, hazelnut oil, avocado oil, sunflower oil, rapeseed oil, soybean oil, grape-seed oil, cotton-seed oil, corn oil and combinations of these. In an embodiment, the continuous fat phase of the food composition of the invention comprises between 2 and 30 wt. % of a high-melting fat selected from the group consisting of stearin or mid-fractions of shea butter, kokum butter, sal butter, cocoa butter, palm oil, algal oil and combinations of these; and between 70 and 98 wt. % of a low-melting fat selected from the group consisting of high oleic sunflower oil, high oleic safflower oil, high oleic soybean oil, high oleic rapeseed oil such as high oleic canola oil, high oleic algal oil, olive oil, macadamia nut oil, hazelnut oil, avocado oil, sunflower oil, rapeseed oil, soybean oil, grape-seed oil, cotton-seed oil, corn oil and combinations of these.

The continuous fat phase according to the composition of the invention may be aerated. In the context of the present invention, the continuous fat phase being aerated means that air cells are present which are directly in contact with the continuous fat phase, in contrast to the air cells contained within the porous particles. Aerating the continuous fat phase in addition to having porous particles further increases the light texture of the composition, and reduces the calories consumed for the same volume. The term "aerated" is used to refer to a foam, in other words a dispersion of a gas in a solid or liquid medium. The gas may be any gas commonly used for foam generation such as $CO_2$, $N_2$ or $N_2O$, but typically the gas is air. The aerated continuous fat phase may have a porosity of between 1 and 80%, for example between 10 and 75%.

In an embodiment, the food composition of the invention may comprise a high-melting fat having a melting point between 35° C. and 80° C. (for example between 40° C. and 50° C.), a medium-melting fat having a melting point between 15° C. and 30° C. (for example between 18° C. and 25° C.), and a low-melting fat having a melting point between −50° C. and 5° C. For example the continuous fat phase of the food composition of the invention may be aerated and may consist of a high-melting fat having a melting point between 35° C. and 80° C. (for example between 40° C. and 50° C.), a medium-melting fat having a melting point between 15° C. and 30° C. (for example between 18° C. and 25° C.), and a low-melting fat having a melting point between −50° C. and 5° C. In an embodiment, the food composition may comprise only non-interesterified fat, the non-interesterified fat comprising (for example consisting of) a high-melting fat, a medium-melting fat, and a low-melting fat, The food composition may comprise, on a total fat basis, less than 45 wt. % (for example less than 40 wt. %) of saturated fatty acids, between 9 and 60 wt. % (for example between 15 and 50 wt. %) of monounsaturated fatty acid, and less than 30 wt. % of polyunsaturated fatty acid. For example, the continuous fat phase of the food composition may comprise, on a total fat basis, less than 45 wt. % (for example less than 40 wt. %) of saturated fatty acids, between 9 and 60 wt. % (for example between 15 and 50 wt. %) of monounsaturated fatty acid, and less than 30 wt. % of polyunsaturated fatty acid.

Interesterified fat is a type of fat where the fatty acid residues have been moved from one triglyceride molecule to another, or from one position on the glycerol backbone to another. Saturated fatty acids are not common in the central "2 position" of natural triglycerides. They are more common in interesterified fats, where the interesterification process has re-arranged the positions of the fatty acids. The fat phase of the composition of the invention may have a ratio of SSU triglycerides to SUS triglycerides of less than 0.1, wherein S indicates a saturated fatty acid residue with 16 to 24 carbon atoms and U indicates an unsaturated fatty acid residue with 18 carbon atoms. The description SSU indicates a triglyceride with S in the 1 position, S in the 2 position and U in the 3 position of the glycerol backbone. (It should be noted that SSU and USS are equivalent in this context as the 1 and 3 positions are interchangeable.) Similarly SUS triglycerides have S in the 1 position, U in the 2 position and S in the 3 position of the glycerol backbone.

The food composition of the invention may have a low moisture content, for example less than 2.5% water by weight. For example the continuous fat phase of the food composition of the invention may be aerated and may have a low moisture content, for example less than 2.5% water by weight. It should be noted that an aerated continuous fat phase of the food composition of the invention can be formed without moisture, for example without the use of surfactants in water or the formation of an emulsion containing water. Food ingredients that are completely free from moisture are rare, but the composition of the invention may be essentially free from water.

The continuous fat phase of the food composition of the invention may crystallize at two distinct temperatures between 50° C. and 0° C. This is particularly beneficial when the continuous fat phase is aerated. The two-step crystallization allows the separation during processing of the stabilization of gas bubbles (after at least a portion of the high-melting fat crystallizes) and the formation of a network in the bulk (after at least a portion of the medium-melting fat crystallizes). The continuous fat phase of the food composition of the invention may have a solid fat content between 5 and 35% at 20° C. and a solid fat content at 10° C. increased by between 10 and 20% from the value at 20° C.

For example the continuous fat phase of the food composition of the invention may have a solid fat content of 10% at 20° C. and solid fat content at 10° C. of 25%, this being increased by 15%. The solid fat content may be measured by pulsed NMR, for example according to the IUPAC Method 2.150 (tempered). The solid fat content may also be measured by differential scanning calorimetry.

The continuous fat phase of the food composition of the invention may be aerated and comprise gas bubbles whose surface is wrapped by glyceride crystals. Such crystal-wrapped bubbles being obtainable by cooling the composition such that at least a portion of the high-melting fat crystallizes (for example forming a gel) and then whipping the composition. Particularly stable assemblies of crystal-wrapped bubbles can be obtained by using a process of prolonged and intensive whipping. The continuous fat phase of the food composition of the invention may comprise glycerides selected from the group consisting of monoglycerides, diglycerides, esters of monoglycerides, esters of diglycerides and combinations of these. For example glycerides with a melting point between 35° C. and 60° C., for example between 40° C. and 50° C. These glycerides can assist in the formation of crystal-wrapped bubbles. Under conditions at which the continuous fat phase has a solid fat content between 0.1 and 80% (e.g. between 5 and 20%), the composition of the invention may comprise gas bubbles having at least 50% of their surface occupied by crystals, the crystals comprising a glyceride selected from the group consisting of monoglycerides, diglycerides, triglycerides, esters of monoglycerides, esters of diglycerides and combinations of these. The crystals may comprise (for example consist of) triglycerides.

A gel is a non-fluid network characterised by a continuous liquid throughout its whole volume. A gel may be defined by its rheology. For example at a frequency of 1 Hz, the measured linear shear elastic modulus G' of a gel may be greater than 10 Pa and the viscous modulus G'' may be less than G'. Gels most suitable for foam generation have a linear shear elastic modulus G' initially in the range $10^2$-$10^7$ Pa at 1 Hz, for example a linear shear elastic modulus G' initially in the range $10^2$-$10^6$ Pa at 1 Hz, for further example a linear shear elastic modulus G' initially in the range $10^3$-$10^6$ Pa at 1 Hz.

The percentage of the gas bubbles' surface occupied by crystals may be measured using microscopy (for example optical and/or confocal microscopy), coupled with suitable image analysis techniques. With a high level of surface coverage it may be immediately obvious after inspection by microscopy that at least 50% of the surface of the gas bubbles is occupied by crystals.

The crystals occupying at least 50% of the surface of the gas bubbles jam together, resisting any shrinkage of the bubbles and providing a stable, flowable foam when the continuous phase is fluid, such as when the fat phase has a solid fat content between 0.1 and 80%. The crystals occupying at least 50% of the surface of the gas bubbles may cause the bubbles to have a non-relaxing shape when the foams are diluted with oil. The crystals comprising a glyceride occupying the surface of the gas bubbles may form layers having an average thickness below 5 μm.

In the context of the present invention the term flowable foam refers to a foam which can be processed in pumping or stirring units using typical food process equipment without undergoing obvious structural coarsening or collapse. The flowable foam may be flowable under gravity after stirring (for example at 20° C.).

The food composition of the invention may comprise gas bubbles having their surface occupied by glyceride crystals, for example triglyceride crystals, such that their surface density is at least 15 mg·m$^{-2}$, for example at least at least 25 mg·m$^{-2}$, for example at least 50 mg·m$^{-2}$, for further example at least at least 200 mg·m$^{-2}$.

The high-melting fat comprised within an embodiment of the food composition of the invention may be present at a level of between 10 and 30 wt. % of the total fat. The medium-melting fat comprised within an embodiment of the food composition of the invention may be present at a level of between 35 and 75 wt. % of the total fat. The low-melting fat comprised within an embodiment of the food composition of the invention may be present at a level of between 15 and 35 wt. % of the total fat. Such quantities of the three different melting-point fats provide the desired textural and processing characteristics, especially when the continuous phase of the food composition is aerated.

The high-melting fat comprised within an embodiment of the food composition of the invention may have a saturated fatty acid content greater than 58%. The medium-melting fat comprised within an embodiment of the food composition of the invention may have a saturated fatty acid content of between 35 and 55%. The low melting fat comprised within an embodiment of the food composition of the invention may have a saturated fatty acid content of below 20%. The overall saturated fatty acid content of the food composition of the invention may be below 45%, on a total fat basis.

The high melting fat comprised within an embodiment of the food composition of the invention may be selected from the group consisting of stearin or mid-fractions of shea butter, kokum butter, sal butter, cocoa butter, palm oil and algal oil and combinations of these. The medium-melting fat comprised within an embodiment of the food composition of the invention may be selected from the group consisting of soft olein fractions of palm oil, shea butter, kokum butter, sal butter, cocoa butter and algal oil, and combinations of these. The low melting fat comprised within an embodiment of the food composition of the invention may be selected from the group consisting of high oleic sunflower oil, high oleic safflower oil, high oleic soybean oil, high oleic rapeseed oil such as high oleic canola oil, high oleic algal oil, olive oil, macadamia nut oil, hazelnut oil, avocado oil, sunflower oil, rapeseed oil, soybean oil, grape-seed oil, cotton-seed oil, corn oil and combinations of these.

Good results for aerating the continuous fat phase are obtained using a fat phase having high levels of triglycerides with saturated fatty acids in the 1 and 3 position. The fat phase of an embodiment of the food composition of the invention may comprise 0.5 to 1.5 wt. % SSS, 2.0 to 3.5 wt. % SSU, more than 40 wt. % SUS, between 20 and 35 wt. % SUU and between 15 and 35 wt. % UUU, wherein S indicates a saturated fatty acid residue with 16 to 24 carbon atoms (C16:0-C24:0) and U indicates an unsaturated fatty acid residue with 18 carbon atoms. The ratio of saturated fatty acid residues with 16 carbons (C16:0) to saturated fatty acid residues with 18 to 24 inclusive carbon atoms (C18:0-C24:0) comprised within the continuous fat phase of the food composition of the invention may be between 0.5 and 4.0, for example between 1 and 3.5. A higher quantity of C16:0 (palmitic) fatty acid residue in the fat phase compared to longer chain fatty acid residues provides lower viscosity at aeration temperatures between 15 and 20° C. and allows better aeration.

The food composition of the invention may be a confectionery filling or a spread. The food composition may be a fat-continuous aerated material such as a fat-continuous mousse, for example a fat-continuous chocolate mousse. The food composition according to the invention may be a sweet fat-based spread, such as a chocolate and hazelnut spread, or a white chocolate spread. The food composition of the invention may comprise hazelnuts and/or cocoa. The food composition of the invention may be free from palm oil. In an embodiment of the invention where the food composition is a hazelnut spread, the porous particles may comprise cocoa and/or hazelnut pieces dispersed in the amorphous continuous phase.

The porous particles according to the invention may comprise additional food ingredients dispersed in the amorphous continuous phase, for example ingredients selected from the group consisting of nut pieces, cocoa pieces and milk powder. In an embodiment of the invention where the food composition is a chocolate and hazelnut spread, the porous particles may comprise hazelnut and/or almond proteins, for example almond or hazelnut plant milk.

The food compositions according to the invention provide an attractive in-mouth sensation. The compositions can be slightly mouth-warming, providing a feeling promoting a sense of indulgence, for example in a sweet spread. Without wishing to be bound by theory, the inventors believe that this slight mouth-warming is due to the amorphous component of the particles liberating heat rapidly when it dissolves in saliva. Amorphous sugar has an exothermic enthalpy of dissolution and the porous structure makes the particles dissolve rapidly. Soft textured compositions with a continuous fat phase generally contain less crystalline fat than harder textured compositions such as chocolate. This means that there is less endothermic crystal melting taking place in the mouth to counteract the exothermic dissolution. Thus, in a soft textured composition with a continuous fat phase having a high level of liquid fat, the exothermic effect is strong enough to alter the in-mouth perception.

The food composition according to the invention may be a confectionery filling; for example a sweet filling for a pastry, biscuit, extruded cereal, or moulded chocolate product.

The food composition according to the invention may be a confectionery filling for a biscuit such as a wafer. Wafers are baked products which are made from wafer batter and have crisp, brittle and fragile consistency. They are thin, with an overall thickness usually between <1 and 4 mm and typical product densities range from 0.1 to 0.3 g/cm$^3$. The surfaces are precisely formed, following the surface shape of the plates between which they were baked. They often carry a pattern on one surface or on both. Wafers may also be produced by extrusion. Two basic types of wafer are described by K. F. Tiefenbacher in "Encyclopaedia of Food Science, Food Technology and Nutrition p 417-420—Academic Press Ltd London—1993":

1) No- or low-sugar wafers. The finished biscuits contain from zero to a low percentage of sucrose or other sugars. Typical products are flat and hollow wafer sheets, moulded cones or fancy shapes.

2) High-sugar wafers. More than 10% of sucrose or other sugars are responsible for the plasticity of the freshly baked sheets. They can be formed into different shapes before sugar recrystallization occurs. Typical products are moulded and rolled sugar cones, rolled wafer sticks and deep-formed fancy shapes.

The amorphous porous particles comprised within the composition according to the invention allow the sucrose content of a soft fat based composition such as a spread to be reduced without the need for ingredients that are unfamiliar to consumers. In an embodiment the invention provides a spread having the same sweetness as a control spread, the control having a sucrose content between 40 and 65 wt. % (for example 45 and 60 wt. %), but wherein the sucrose content (for example the sucrose content on a mass basis or the sucrose content on a volume basis) has been reduced by at least 20% (for example at least 30%) compared to the control, and wherein the spread contains no mono, di or tri-saccharides apart from sucrose or lactose and no sugar alcohols or high intensity sweeteners. For example the spread may contain no saccharides apart from sucrose or lactose and no sugar alcohols or high intensity sweeteners. For example the control and the spread provided by the invention may consist of the same ingredients, merely in different proportions. A spread according to the invention may have a continuous fat phase and comprise sucrose, milk, cocoa and hazelnuts.

A further aspect of the invention provides a process for manufacturing a food composition having a soft texture at 20° C. (for example wherein the texture of the food composition is such that it exhibits a maximum penetration force of less than 1500 g at 20° C.), the process comprising the steps of a) subjecting a mixture comprising sweetener, bulking agent and surfactant to high pressure, for example 50 to 300 bar, for further example 100 to 200 bar; b) adding gas to the mixture; c) drying the mixture to form porous particles comprising a continuous amorphous phase (for example spraying and drying the mixture to form porous particles comprising a continuous amorphous phase); and d) mixing the porous particles with fat.

In an embodiment, the mixture comprising sweetener, bulking agent and surfactant may be mixed with 30% water, preferably 40% water and more preferably 50% water until full dissolution is achieved. The mixture comprising sweetener, bulking agent and surfactant may be subjected to high-pressure, for example a pressure greater than 2 bar, typically 50 to 300 bar, preferably 100 to 200 bar, more preferably 100 to 150 bar.

The gas is preferably dissolved in the mixture before drying (for example spraying and drying). The mixture comprising dissolved gas being held under high pressure up to the point of drying (for example spraying and drying). Typically the gas is selected from the group consisting of nitrogen, air, carbon dioxide, nitrous oxide and argon. The gas may be air. For example the gas may be nitrogen and it is added for as long as it takes to achieve full dissolution of gas in the said mixture. For example the time to reach full dissolution may be at least 2 minutes, for example at least 4 minutes, for further example at least 10 minutes, for further example at least 20 minutes, for further example at least 30 minutes.

The drying may occur during the process of spray-drying. The pressurised mixture being sprayed to form droplets which are then dried in a column of air, for example warm air, the droplets forming a powder.

In an embodiment of the process of the invention, the mixture comprising sweetener, bulking agent and optionally a surfactant may further comprise partially aggregated proteins, for example partially aggregated proteins selected from the group consisting of soy proteins (for example soy glycinin, for further example conglycinin), egg proteins (for example ovalbumin, for further example ovaglobulins), rice proteins, almond proteins, wheat proteins (for example gluten), milk proteins (for example whey protein, for further example casein) and combinations of these. When the mixture is dried (for example spray-dried) the partially aggregated proteins become dispersed in the amorphous continuous phase of the porous particles, for example they are dispersed as small clumps of partially aggregated proteins within the continuous amorphous phase of the particles. The partially aggregated proteins may act to stabilize the formation of porosity within the particles. The proteins may have been partially aggregated by the application of shear, for example processing a protein solution or suspension in a high shear mixer for at least 15 minutes. The proteins may have been partially aggregated by a heat treatment at a temperature between 85° C. and 100° C. for a period of between 50 and 400 seconds and a pH of between 5.8 and 6.2. For example, whole milk powder or skimmed milk powder may be dispersed in water, adjusted to pH 5.8 to 6.2 with an organic acid; and heated to a temperature from 85° C. to 100° C. for a period of between 50 and 400 seconds to form partially aggregated milk proteins.

For further example, to form partially aggregated proteins, whey protein and casein may be dispersed in water; the pH adjusted to between 5.8 and 6.2 and the resulting composition heated to a temperature from 85° C. to 100° C. for a period of from 1 minute to 10 minutes.

For further example, to form partially aggregated proteins, the pH of an aqueous composition comprising skimmed milk or whole milk may be adjusted to between 6.0 and 6.2; and the composition may be heated to a temperature from 90° C. to 100° C. for a period of from 3 minute to 8 minutes.

Partially aggregated proteins may be formed in the presence of cations. For example, an aqueous protein composition having a concentration of 1 to 15 wt. % protein and comprising micellar casein and whey proteins with a casein to whey protein ratio of 90/10 to 60/40 may be adjusted to a pH between 6.1 and 7.1 and divalent cations may be added to provide a concentration of 3 to 8 mM free divalent cations. The resulting composition may be heated to a temperature from 85° C. to 100° C. for a period of from 30 seconds to 3 minutes. The divalent cations may for example be selected from the group consisting of Ca cations, Mg cations and a combination thereof.

Non-dairy proteins may be used to form partially aggregated proteins. For example, the pH of an aqueous protein composition comprising a non-dairy protein selected from the group consisting of soy (for example soy glycinin or conglycinin), egg (for example ovalbumin or ovaglobulins), rice, almond, wheat (for example gluten) and combinations of these may be adjusted to between 5.8 and 6.1 and the composition heated to a temperature from 65° C. to 95° C. (for example 68° C. to 93° C.) for a period of from 3 minutes to 90 minutes.

The process conditions described provide clumps of partially agglomerated proteins with a size small enough to pass through a spray nozzle (for example during spray-drying), but still provide a positive impact on the mouthfeel of the food composition of the invention.

The mix obtained by mixing porous particles with fat in step (d) of the process of the invention may be refined, for example it may be roll-refined. It is advantageous that the porosity of the porous particles according to the invention is able to survive size reduction processes used in confectionery filling and spread manufacture such as roll refining. Pores of approximately spherical shape provide a strong structure to the particles and having multiple small closed pores means that the particles can be fractured without significant loss of internal porosity.

The mix obtained by mixing porous particles with fat in step (d) of the process of the invention may be further mixed with an ingredient selected from the group consisting of milk powder, crystalline sucrose, hazelnuts and combinations of these. In an embodiment of the process of the invention, an ingredient selected from the group consisting of milk powder, crystalline sucrose, hazelnuts and combinations of these may be mixed with fat and refined, for example in a roll-refiner to form a fat mixture, and then this fat mixture may be combined with un-refined porous particles.

The mix obtained by mixing porous particles with fat in step (d) of the process of the invention may be aerated.

In an embodiment, the fat mixed with porous particles in step (d) of the process of the invention may be liquid and comprise a high-melting fat having a melting point between 35° C. and 80° C. (for example between 40° C. and 50° C.), a medium-melting fat having a melting point between 15° C. and 30° C. (for example between 18° C. and 25° C.), and a low-melting fat having a melting point between −50° C. and 5° C. The process of the invention in this embodiment may comprise the further processing steps of letting the composition perform a first crystallization event; aerating the composition; and controlling the temperature of the aerated composition to allow a second crystallization event in the composition. In the context of the present invention, the fat being liquid means that the solid fat content of the fat is less than 0.1%. Letting the composition perform a first crystallization event may involve cooling the composition, for example cooling the composition to a temperature below the melting point of the high-melting fat but above the melting point of the medium-melting fat. The first crystallization event may be initiated by the addition of seeding crystals, for example cooling the composition to below the melting point of the high-melting fat and adding seeding crystals of high-melting fat. The solid fat content of the composition during aeration according to this embodiment of the process of the invention may be between 5 and 20% of the total fat. It has been surprisingly found that by cooling a liquid composition comprising fat to a temperature at which there is partial crystallization and a gel is formed and then whipping the composition, a stable foam is produced. The composition may form a gel before it is aerated in processes of the invention. The gel structure may continue to develop during and after aeration. Good results may be obtained by allowing the partially crystallized composition to mature before being aerated. In this embodiment of the process of the invention there may be a time interval of at least 2 minutes between the first crystallization event and the start of aeration. The temperature for the first crystallization event in this embodiment of the process of the invention should be chosen to allow crystallization of at least part of the high-melting fat in the composition without significant crystallization of the medium-melting fat, for example without any crystallization of the medium-melting fat. The first crystallization event in this embodiment of the process of the invention may be performed at a composition temperature of between 16 and 24° C. For ease of processing, the temperature may be raised before aeration, as long as some crystals remain, however, the method of the invention may be performed without any heating of the composition between the first and second crystallization events. The temperature for the second crystallization event in this embodiment of the process of the invention should be chosen to allow crystallization of at least part of the medium-melting fat in the composition. The second crystallization event may be performed at a composition temperature at least 5° C. lower than the composition temperature of the first crystallization event (for example between 5° C. and 20° C. lower than the composition temperature of the first crystallization event). The second crystallization event may for example be performed in a cooling tunnel, for example a cooling tunnel with a minimum temperature between 5 and 15° C. The solid fat content of the composition may increase by at least 10% of the total fat during the second crystallization event in the method of the invention.

In the embodiment of the process of the invention where the process comprises the steps of letting the composition perform a first crystallization event; aerating the composition; and controlling the temperature of the aerated composition to allow a second crystallization event, the process of the invention provides a part-processed aerated composition before the second crystallization event which is both fluid and has excellent foam stability. This allows the foam to undergo processing steps which would normally be expected to damage the foam. For example, inclusions with an average diameter greater than 2 mm may be mixed into the aerated composition before the second crystallization event in the method of the invention. Inclusions with an average diameter greater than 2 mm are those which are retained by a sieve with a 2 mm opening.

In an embodiment of the process of the invention where the process comprises the steps of letting the composition perform a first crystallization event; aerating the composition; and controlling the temperature of the aerated composition to allow a second crystallization event, the aeration may comprise mechanical agitation, for example whipping. Although foams can be obtained by non-mechanical agitation methods, such as dissolving or dispersing gas under pressure and then releasing it, to obtain the most stable foams it is preferable to apply mechanical agitation. Without wishing to be constrained by theory, it is proposed that mechanical agitation increases the wrapping of the gas bubbles with glyceride crystals. Mechanical agitation may for example be applied using rotor-stator type of equipment, such as a Haas-Mondomix aerating system. After the first crystallization event, and maturation (if any), the partial-crystallized composition may be gently sheared to allow an easy transfer to the aerating system. Mechanical agitation, for example whipping, may be applied for at least 5 s (such as the residence times in a continuous rotor-stator system), for example at least 1 minute, for example at least 5 minutes (such as in a batch whipping machine), for example at least 10 minutes, for further example at least 30 minutes. Foam stability generally increases with increasing mechanical agitation time. The aeration step in the process of the invention may comprise gas depressurization followed by mechanical whipping. Such a combination of initial bubble generation using dissolved/dispersed gas and a pressure drop followed by mechanical agitation may usefully be employed, however all process steps may be performed at or near atmospheric pressure, for example at an absolute pressure of between 800 hPa and 2100 hPa, for example between 850 hPa and 1100 hPa.

The process of the invention may further comprise the step of filling the food composition into moulds, for example where the composition is a confectionery filling it may be deposited as a centre in a chocolate shell-moulding process. The composition may be combined with extruded cereal, for example co-extruded as a filling in a cereal tube which may be crimped to form cereal pillows. The composition after aeration may be laminated between wafer sheets, for example to form a wafer "book".

In a further aspect the present invention also provides for a food composition having a soft texture at 20° C. obtained (for example obtainable) by the process of the invention.

Those skilled in the art will understand that they can freely combine all features of the present invention disclosed herein. In particular, features described for the composition of the present invention may be combined with the process of the present invention and vice versa. Further, features described for different embodiments of the present invention may be combined. Where known equivalents exist to specific features, such equivalents are incorporated as if specifically referred to in this specification. Further advantages and features of the present invention are apparent from the figures and non-limiting examples.

Experimental Section

Determination of Glass Transition Temperature

Glass transition temperatures (Tg) were measured by Differential Scanning calorimetry (TA Instrument Q2000). A double scan procedure was used to erase the enthalpy of relaxation and get a better view on the glass transition. The scanning rate was 5° C./min. The first scan was stopped approximately 30° C. above Tg. The system was then cooled at 20° C./min. The glass transition was detected during the second scan and defined as the onset of the step change of the heat capacity.

Determination of Structures Using Cryo-Scanning Electron Microscopy

Cryo-Scanning Electron Microscopy (Cryo-SEM) and X-ray Tomography (μCT) are used to investigate the microstructure of the amorphous porous particles of the present invention within a fat based food matrix.

A 1 cm$^3$ piece of sample was glued into a Cryo-SEM sample holder using TissueTek. It was rapidly frozen in slushy nitrogen prior to its transfer into the cryo-preparation unit Gatan Alto 2500 at −170° C. The frozen sample was fractured using a cooled knife, making its internal structure accessible. The fracture was not performed when the external surface of the chocolate was analyzed. A slight etching of superficial water was performed in the preparation unit for 15 min at −95° C., followed by sample stabilization at −120° C. A final coating was done by an application of a 5 nm platinum layer onto the surface. For visualization a FEI Quanta 200 FEG at 8 kV in high vacuum mode was used.

Determination of Sphericity

Sphericity was measured by the Camsizer XT. It is an opto-electronic instrument, allowing the measurement of the size and shape parameters of powders, emulsions and suspensions. The technique of digital image analysis is based on the computer processing of a large number of sample's pictures taken at a frame rate of 277 images/seconds by two different cameras, simultaneously. The sample is lightened by two pulsed LED light sources during the measurement. Particle size and particle shape (including sphericity) are analyzed with a user-friendly software which calculates the respective distribution curves in real time. The perimeter of a particle projection and the covered area were measured to obtain the sphericity.

EXAMPLES

Example 1

Preparation of Amorphous Porous Particles

| Ingredients | Amount (wt %) |
| --- | --- |
| water | 50 |
| Sucrose | 30 |
| Skimmed milk powder | 20 |

All ingredients were weighed separately and then mixed with a polytron PT3000D mixer until full dissolution at room temperature with a speed rate between 6000 and 12000 rpm. The inlet solution is transferred in a vessel at controlled temperature of 55° C. and is then pumped at 100-130 bar. High pressure nitrogen is injected at 0.5-2 NL/min for at least 10 mins or a least until full dissolution of the gas in the solution is achieved. After a pre-heating at 60 deg C., the solution is spray-dried using a one-stream closed-top spray drier according to the parameters listed in the table below:

| Spray-drying parameters | |
| --- | --- |
| Nozzle | Alphanumeric (diameter 0.2) |
| Inlet air temperature | 120 deg C. |
| Output temperature | 80 deg C. |
| Drying air volume | 400 m3 |
| Pump pressure | 130 bars |
| Gas injection | 2 NL/min |
| Solution flowrate | 12 L/h |

Amorphous porous particles were obtained having an internal structure with closed porosity, see micrograph FIG. 1. The powder contained 2.17 wt. % moisture, had a closed porosity of 50.3%, a D90 of 46.3 microns and a Tg of 52.1° C. Similar amorphous porous particles were produced from a mixture containing 50 wt. % water, 33.95 wt. % sucrose, 14.55 wt. % Promitor® soluble fibre (Tate & Lyle) and 1.5 wt. % sodium caseinate. Measured sphericity values were between 0.85 and 0.89.

Example 2

Two model spread recipes were produced. The overall compositions on a weight basis were the same, but in one spread, crystalline sucrose and part of the skimmed milk powder were replaced by the sucrose/skimmed milk powder porous amorphous particles of Example 1.

| Ingredients (wt. %) | Reference Spread | Porous amorphous particles spread |
| --- | --- | --- |
| Sucrose | 17.06 | 0 |
| Hazelnuts | 20.18 | 20.18 |
| Vanilla flavouring | 0.19 | 0.19 |
| High oleic oil | 27.17 | 27.17 |
| Skim milk powder (SMP) | 35.40 | 24.03 |
| Sucrose/SMP porous particles from Ex 1 | 0 | 28.43 |

A premix of sucrose, hazelnuts, cocoa, lecithin, vanilla, high oleic oil and skim milk was refined using a 3 roll refiner (Refiner Exaakt, Haslas GmbH). Both refiner gaps were set at 30 microns. Then, sucrose/skimmed milk powder porous amorphous particles of Example 1 were added and mixed for 5-10 minutes until a homogeneous mass was obtained.

Although the sample with the porous particles has the same percentage of sucrose on a weight basis, on a volume basis it has 22% less sugar. Tasting was performed by a panel of 12 tasters. The spreads were provided on spoons, the same weight was placed on the spoon for each sample. Panellists were instructed to take the whole spoonful into their mouths. 11 out of 12 panellists considered that the spread containing porous particles tasted sweeter. Similar spreads were prepared containing fat reduced cocoa powder.

The texture of the spread containing porous amorphous particles was measured.

Samples of spread were collected in plastic cups (~30 mL) for texture analysis. The samples were left to harden in the fridge for 30 min at 4° C. and then stored at 20° C. and 28° C. for one week. Penetration tests on the stored samples were performed after 1 day and 7 days. The hardness of the spread was evaluated using a Texture Analyzer HDi-Stable Micro Systems equipped with a load cell 5 kg and a conical probe (60°). The maximum force in penetration at room temperature was measured. The test speed was 1.00 mm/s on a distance of 10.0 mm. The trigger force was 2 g.

The maximum force required to penetrate a depth of 10 mm is presented below. The average values were extracted out of 3 replicates.

|  | 20° C. | 28° C. |
| --- | --- | --- |
| Maximum force at 10 mm (day 1) [g] | 21 | 20 |
| stdev | 0 | 1 |
| Maximum force at 10 mm (day 7) [g] | 18 | 18 |
| stdev | 1 | 1 |

Examples of recipes for further spreads are given below:

| Ingredients | Spread 1 | Spread 2 | Spread 3 | Spread 4 |
| --- | --- | --- | --- | --- |
| Sucrose | 11.85 | 5.44 | 5.44 | 5.44 |
| Hazelnuts | 15.8 | 15.80 | 15.80 | 15.80 |
| Fat reduced cocoa powder | 7.46 | 7.46 | 7.46 | 7.46 |
| High oleic sunflower oil | 19.0 | 15.0 | 14.25 | 12.75 |
| Shea Stearin | 0.0 | 0.0 | 0.75 | 0.0 |
| Cocoa Butter | 0.0 | 0.0 | 0.0 | 2.25 |
| Skim milk powder | 20.19 | 18.0 | 18.0 | 18.0 |
| Sucrose/SMP porous particles | 12.60 | 18.9 | 18.9 | 18.9 |
| Sunflower Lecithin | 0.40 | 0.40 | 0.40 | 0.40 |
| Natural vanilla flavouring | 0.10 | 0.10 | 0.10 | 0.10 |
| Total weight (g) | 87.40 | 81.10 | 81.10 | 81.10 |
| Expected porosity (%) | 12.6 | 18.9 | 18.9 | 18.9 |
| Fat content (wt. %)* | 30 | 26 | 26 | 26 |

*based on the reference spread weight for a fixed volume

Example 3

The effect of altering the composition of the amorphous matrix of the amorphous particles was examined for different ratios of milk powder (SMP) and sucrose. The amorphous matrix should be stable against crystallization. In the case of confectionery filling manufacture for example, the matrix should remain amorphous under the temperature and humidity conditions experienced during mixing and refining. If processing or storage conditions approach those at which the amorphous material passes through the glass transition then there is a possibility that crystallization will occur leading to a collapse of the particles, for example the lactose present in amorphous porous particles of skimmed milk powder and sucrose may crystallize.

Amorphous porous particles with different ratios of sucrose:SMP were produced; 40:60, 50:50, 60:40, 70:30 and compared to pure amorphous sucrose and SMP. The amorphous SMP was spray dried. The amorphous sucrose was obtained by freeze drying (Millrock, US). A solution containing 10% (weight basis) of sucrose was prepared. It was frozen at −40° C. for 6 hours allowing the formation of ice crystals. Primary drying is performed at 150 mTorr. Ice crystals sublimate and leave voids behind leading to a highly porous structure. Secondary drying consists of a temperature ramp from −40° C. to 40° C. at 1° C./hour. During that stage residual water bound to the matrix is removed by desorption leading very low moisture content, typically 1-2% as measured by ThermoGravimetric Analysis.

As the samples initially have different water activity ($a_w$) values the sorption isotherms were drawn to calculated Tg at the same $a_w$.

1) Sorption isotherms were built by collecting samples during short periods of time (i.e. typically over 48 h) stored in two types of desiccators (one for partial drying and one for humidification). The Tg of each sample was obtained by using the second scan of DSC experiment at 5° C./min heating ramp. The first scan should stop at about 30° C. above the $T_g$ in order to avoid relaxation enthalpy interference with $T_g$ measurement. Onset $T_g$ of the product is then determined using a second scan. After 2 h heating at $T_g$+5° C. $a_w$ is measured at 25° C.

2) BET fitting is performed over the data of moisture content as a function of aw (0.08-0.35) and the Gordon Taylor over the data of Tg as a function of $a_w$ (corresponding range).

a. Brunauer-Emmett-Teller equation (BET):

$$M_{db}(a_w) = \frac{M_m C a_w}{(1-a_w)[1+(C-1)a_w]}$$

where C is a constant and $M_m$ is the BET monolayer moisture content (on dry basis)

b. Gordon-Taylor equation (Gordon and Taylor, 1952):

$$T_g = \frac{kw T_{g,water} + (1-w) T_{g,dry}}{kw + k(1-w)}$$

where w is water content on a weight basis, $T_{g,water}$ is the glass-transition temperature of water estimated at −135° C., $T_{g,dry}$ is the glass-transition temperature of sucrose and k is a curvature constant.

Figure 2:
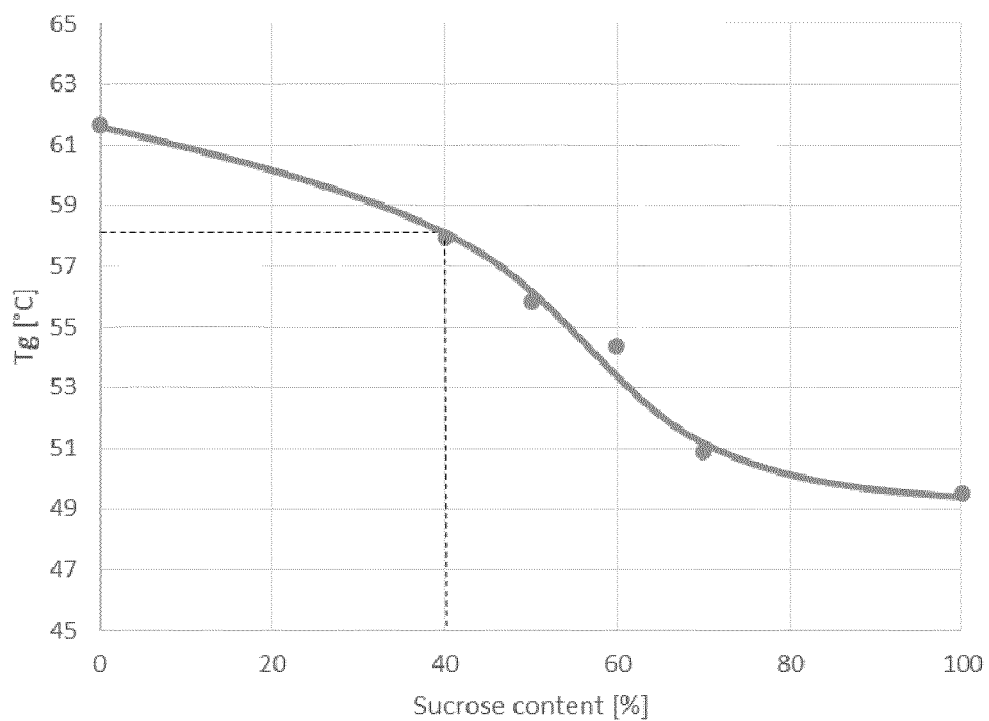
FIG. 2 is a plot of glass transition temperature (Tg/° C.) versus sucrose content for amorphous porous particles of sucrose and skimmed milk powder at 25° C. and a water activity of 0.1.

The glass transition temperature (Tg) is plotted against sucrose content in FIG. 2 for amorphous particles at a water activity of 0.1 and 25° C. It can be seen that there is a much more pronounced decrease in glass transition temperature for increasing sucrose content at or above 40% (a ratio of 0.66:1). This means that there is a significant decrease in stability (against crystallization) when the level of sucrose in an amorphous matrix containing sucrose and skimmed milk powder exceeds 40%. Therefore, when seeking to reduce the sucrose content in a food product by replacing crystalline sucrose with amorphous porous particles of the invention containing sucrose and skimmed milk an optimum proportion to use is around 40% sucrose and 60% skimmed milk powder.

Example 4

The effect of altering porosity and composition on dissolution speed and sweetness impact was investigated. Amorphous porous particles were prepared as in Example 1, with the inlet solution containing 50 wt. % water and 50 wt. % of sucrose+SMP (skimmed milk powder) at the appropriate ratio. No sodium caseinate was added as this is already present in SMP. Particle size distribution was measured using a Camsizer XT (Retsch Technology GmbH, Germany).

| Powder | Ratio sucrose:SMP | Closed porosity | Particle size distribution D90 |
|---|---|---|---|
| A | 70:30 | 50% | 50 μm |
| B | 60:40 | 53% | 53 μm |
| C | 50:50 | 51% | 52 μm |
| D | 40:60 | 57% | 60 μm |
| E | 30:70 | 60% | 55 μm |

Samples with different levels of porosity, but with similar particle size distributions and the same composition were prepared. Sample G was prepared with no gas injection. This produced a very low level of closed porosity (6%). Varying the gas flow up to 2 normal litres per minute allowed increasing levels of closed porosity to be generated.

| Powder | Ratio sucrose:SMP | Closed porosity | Particle size distribution D90 |
|---|---|---|---|
| A | 70:30 | 50% | 50 μm |
| F | 70:30 | 33% | 41 μm |
| G | 70:30 | 6% | 40 μm |

The closed porosity was obtained by measuring the matrix and apparent densities.

The matrix density was determined by DMA 4500 M (Anton Paar, Switzerland AG). The sample was introduced into a U-shaped borosilicate glass tube that is excited to vibrate at its characteristic frequency which depends on the density of the sample. The accuracy of the instrument is 0.00005 g/cm³ for density and 0.03° C. for temperature.

The apparent density of powders was measured by Accupyc 1330 Pycnometer (Micrometrics Instrument Corporation, US). The instrument determines density and volume by measuring the pressure change of helium in a calibrated volume with an accuracy to within 0.03% of reading plus 0.03% of nominal full-scale cell chamber volume.

Closed porosity is calculated from the matrix density and the apparent density, according to the following equation:

$$\text{Closed porosity} = 100 \cdot \left(1 - \frac{\rho_{apparent}}{\rho_{matrix}}\right)$$

The dissolution test was performed as follows. 30.0 g±0.1 g of water (milliQ grade) was placed in a 100 mL beaker (h=85 mm Ø=44 mm) with a magnetic stirrer (L=30 mm Ø=6 mm). The stirring rate was adjusted to 350 rpm and 1.000 g±0.002 g of powder was added in the solution. During the dissolution, the refractive index of the solution was registered each second until a plateau corresponding to complete dissolution was reached. Refractive index was measured using a FISO FTI-10 Fiber Optic Conditioner These experiments were performed at room temperature (23-25° C.).

Figure 3:
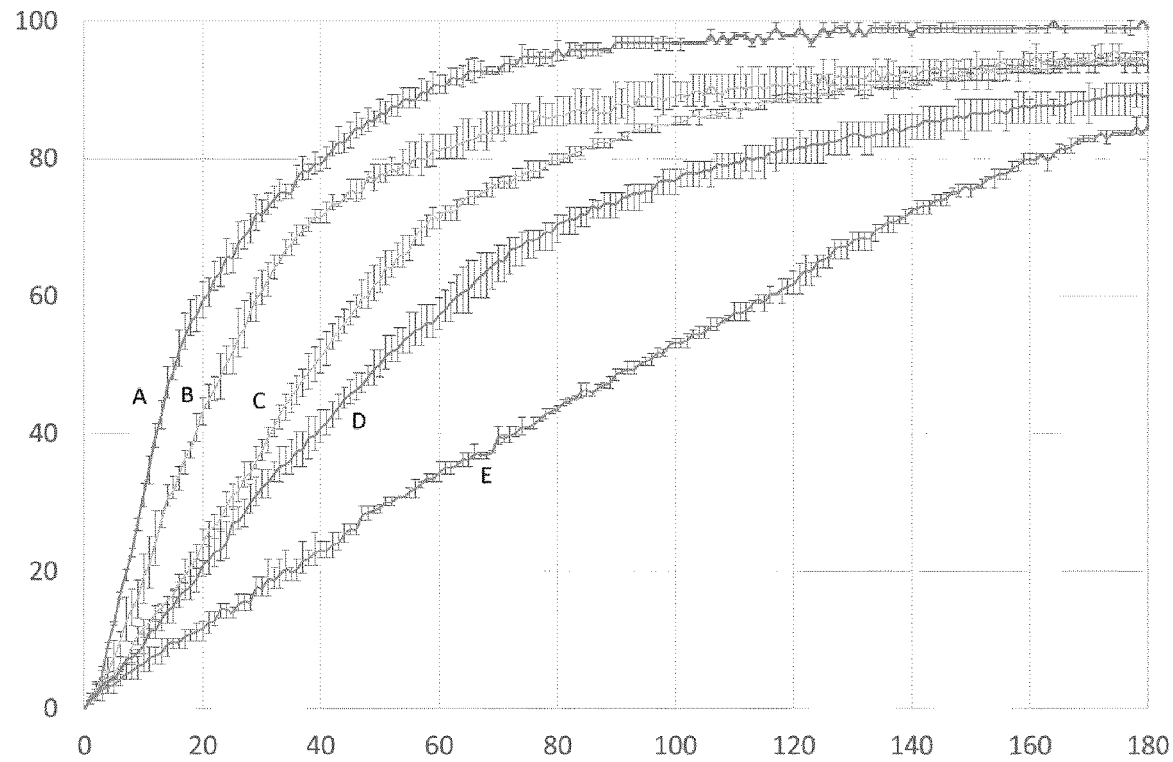
FIG. 3 is a plot of dissolution (%) (vertical axis) versus time (s) (horizontal axis) for porous amorphous powders with different compositions.
Figure 4:
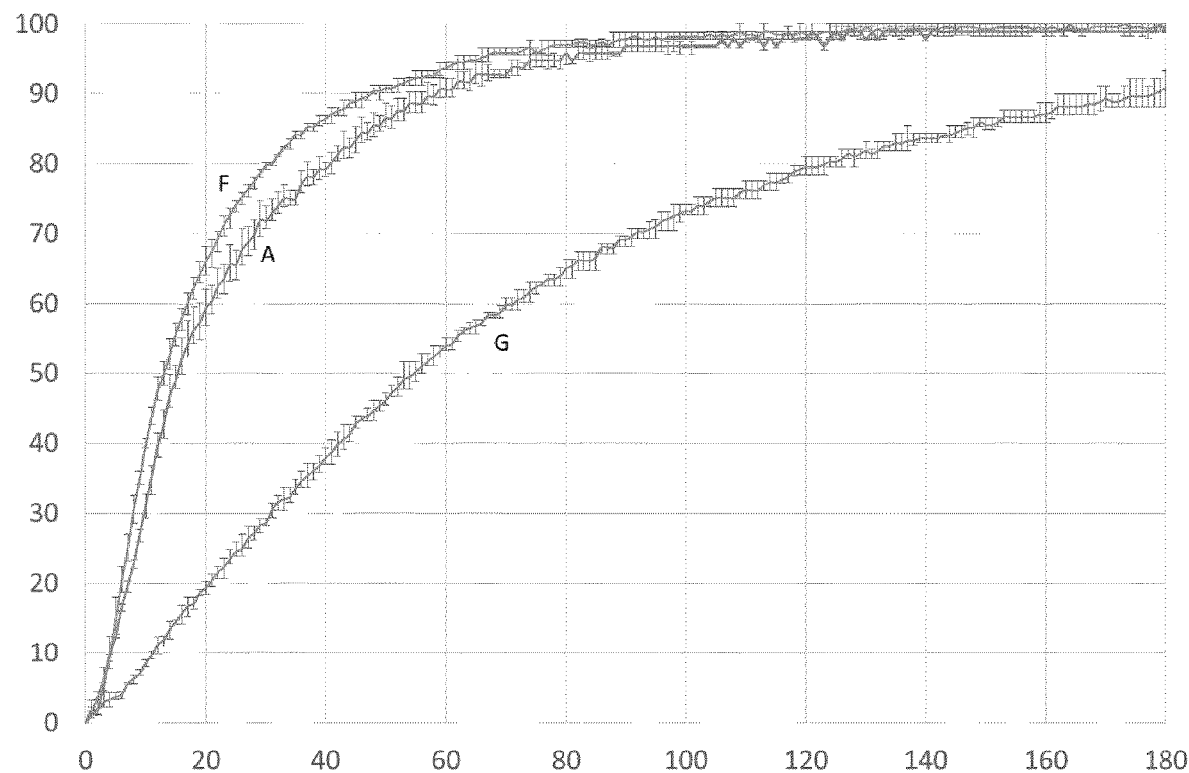
FIG. 4 is a plot of dissolution (%) (vertical axis) versus time (s) (horizontal axis) for amorphous powders with different levels of closed porosity.

The result of varying composition is shown in FIG. 3. Powders with a lower proportion of sucrose dissolve more slowly. The result of varying the porosity is shown in FIG. 4. The powders with significant porosity (A and F) dissolved much more rapidly than the un-gassed sample (G).

Example 5

The porous structure of amorphous particles was examined using synchrotron radiation X-ray tomography microscopy (SRXTM), at the TOMCAT beamline of the Swiss Light Source (SLS), Paul Scherrer Institut, Switzerland. The acquisition followed a standard approach with the rotation axis located in the middle of the field of view. Exposure time at 15 keV was 300 ms and 1,501 projections equi-angulary distributed over 180° were acquired.

Projections were post-processed and rearranged into corrected sinograms. Stacks of 2161 16 bits Tiff images (2560× 2560 pixel) were generated with a resolution of 0.1625 μm per pixel.

Slice data were analysed and manipulated using Avizo 9.0.0 (https://www.fei.com/software/amira-avizo/) software for computed tomography.

The routine used for the measurement was the following. For each sample, 3 stacks of 500 images were analysed. After sub volume extraction, stacks of images were thresholded using an automatic routine to specifically select the matrix material and calculate its volume. Then the surface of each sample was estimated using the surface generation module of the software and the surface values were extracted. Normalized specific surface was calculated as the ratio of the matrix volume by the total material surface (external and pores).

Figure 5A:
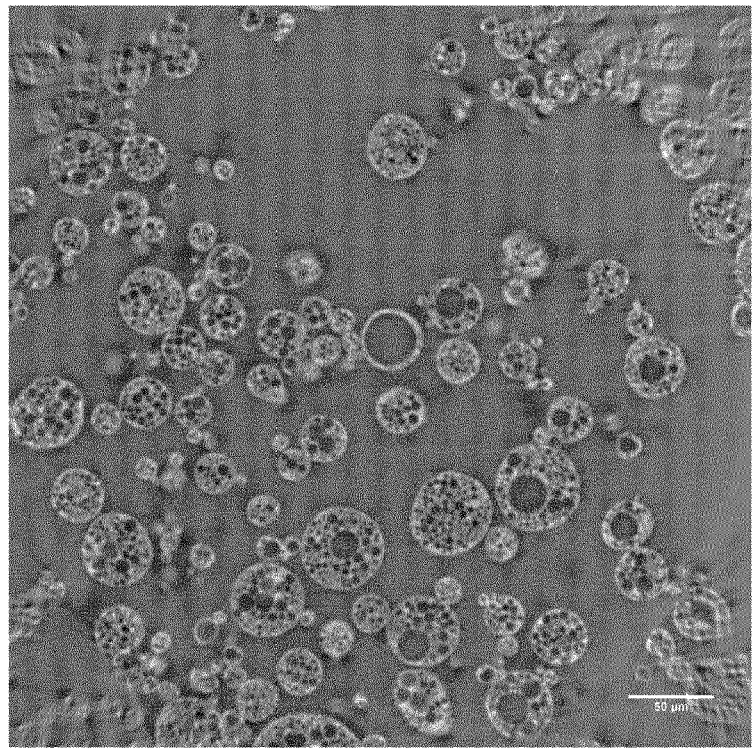
FIG. 5a, 5b, 5c, 5d are synchrotron radiation X-ray tomographic microscopy images for amorphous powders.
Figure 5B:
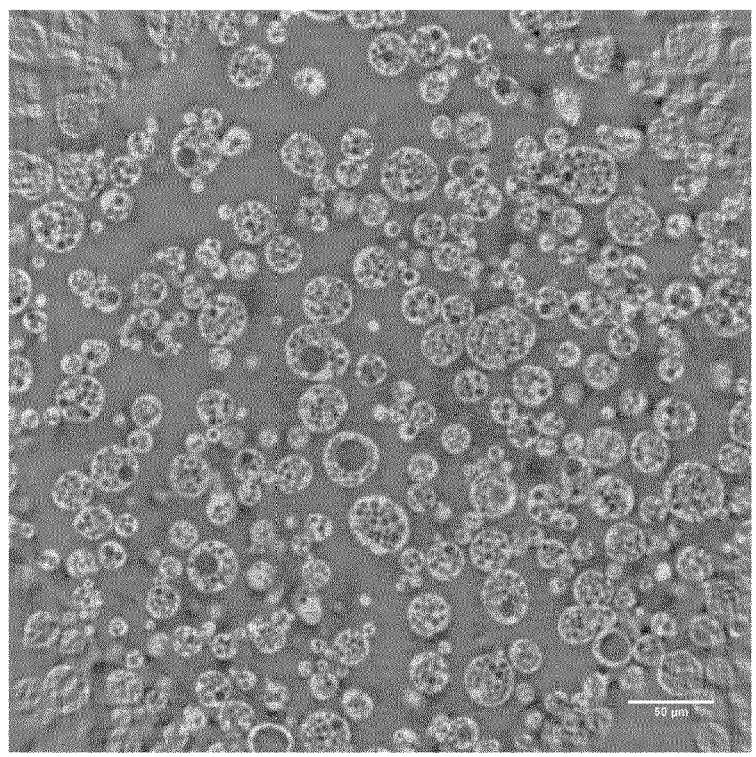
Figure 5C:
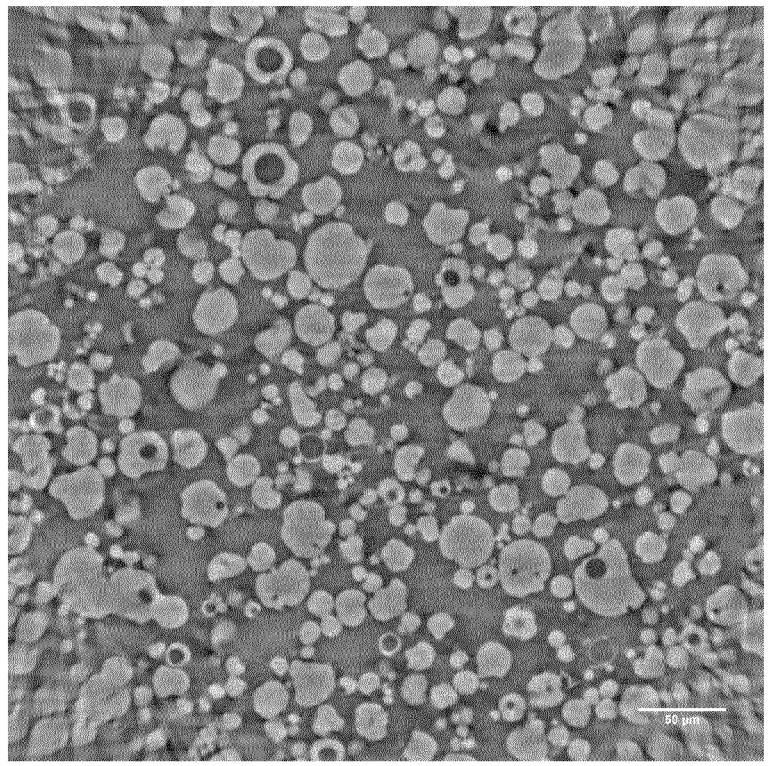
Figure 5D:
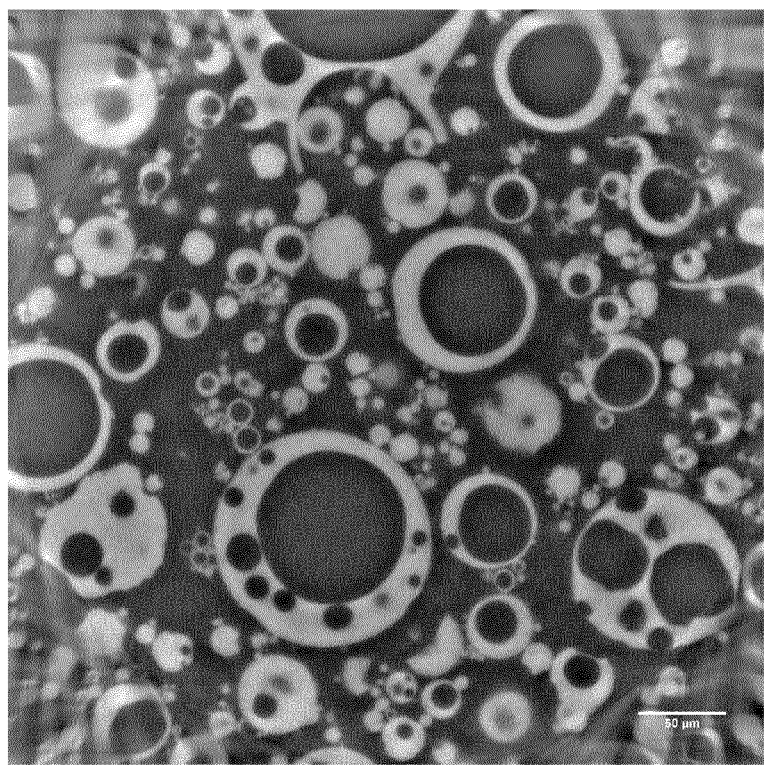

Powders with different levels of closed porosity (A, F and G from Example 5) were imaged, together with a powder (H) as a comparative example which did not contain protein. Powder H was prepared in a similar manner to that described in Example 1, except that the inlet solution contained 50% water, 25% sucrose and 25% of a 21 DE maltodextrin (Roquette) and carbon dioxide was used instead of nitrogen. Powder H had a closed porosity of 31% and a particle size D90 of 184 μm. The images are shown in FIG. 5a (A), FIG. 5b (F), FIG. 5c (G) and FIG. 5d (H). The calculated normalized specific surfaces (mean of three sets of 500 slices) were as follows:

| | Powder | | | |
|---|---|---|---|---|
| | A | F | G | H |
| Normalized specific surface (m⁻¹) | 0.166 | 0.133 | 0.074 | 0.049 |

As can be seen from the images, the porous structure of powders A and F comprise multiple small pores. The internal surface of these pores leads to a high normalized specific surface value. The normalized specific surface for sample F is lower than sample A, consistent with the measured lower closed porosity value. Sample G, where no gassing was applied, has a low porosity and a low normalized specific surface value. For sample H it can be seen that although it has a similar closed porosity value to sample F, the structure is very different, with large voids within the particles. Such a structure is physically weaker than multiple small pores, and if the outer walls of the particles are broken, no (or very little) porosity remains. Sample H has a correspondingly lower normalized specific surface value.

Example 6

Preparation of the Amorphous Porous Particles with Non-Dairy Proteins

Three non-dairy proteins from different origins (vegetable, carbohydrate, grains) were tested as components of amorphous porous powders.

Wheat gluten protein, pea protein and potato protein were used to prepare amorphous porous powders at a level of 3 wt. %. The other components were 60 wt. % sucrose and 37 wt. % Nutriose® (a plant-based fibre from Roquette). A further sample with pea protein was prepared where lactose was used as the bulking agent instead of Nutriose®. For comparison, a powder with 3 wt. % sodium caseinate, 60 wt. % sucrose and 37 wt. % Nutriose® was prepared. The components were dissolved in water at a total solids of 50% and spray dried with gas injection a described in Example 1. All variants were successfully produced with a throughput of 10-12 L/h.

Physical and chemical characterization of the powders was performed. Results of moisture, glass transition and water activity are presented below.

|   |   | Moisture [%] | $T_g$ [° C.] | $a_w$ [—] |
|---|---|---|---|---|
| I | 60% Sucrose, 37% Nutriose ®, 3% NaCas | 2.50 | 48.8 | 0.162 |
| J | 60% Sucrose, 37% Nutriose ®, 3% pea protein | 2.59 | 49.2 | 0.147 |
| K | 60% Sucrose, 37% lactose, 3% pea protein | 2.43 | 51.7 | 0.126 |
| L | 60% Sucrose, 37% Nutriose ®, 3% wheat gluten | 2.11 | 54.1 | 0.114 |
| M | 60% Sucrose, 37% Nutriose ®, 3% potato protein | 2.81 | 46.6 | 0.166 |

Results of particle properties are shown below.

Changing the surfactant (the protein) leads to changes in porosity. Pea protein, potato protein and wheat gluten protein provide high levels of closed porosity, although slightly lower than that obtained by sodium caseinate. The use the fibre Nutriose® seems to favour the formation of closed pores.

|   | Apparent density [g · cm$^{-3}$] | Closed porosity [%] | D90 [μm] |
|---|---|---|---|
| I | 0.624 | 60.8 | 70.2 |
| J | 0.804 | 49.5 | 60.0 |
| K | 0.893 | 43.9 | 55.8 |
| L | 0.749 | 53.3 | 58.1 |
| M | 0.772 | 51.0 | 87.2 |

Figure 6:
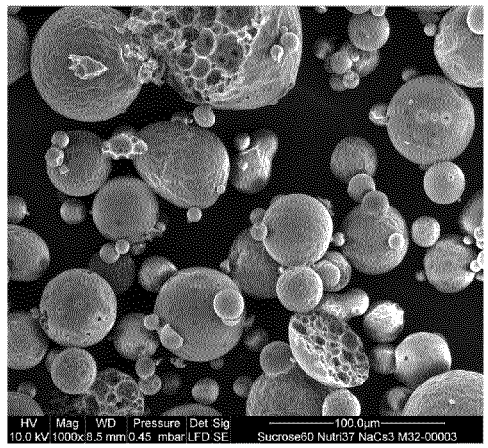
FIG. 6 shows scanning electron micrographs of porous amorphous powders. I: sucrose/Nutriose®/sodium caseinate, J: sucrose/Nutriose®/pea protein, K: sucrose/lactose/pea protein, L: sucrose/Nutriose®/wheat gluten, and M: sucrose/Nutriose®/potato protein.
Figure 6:
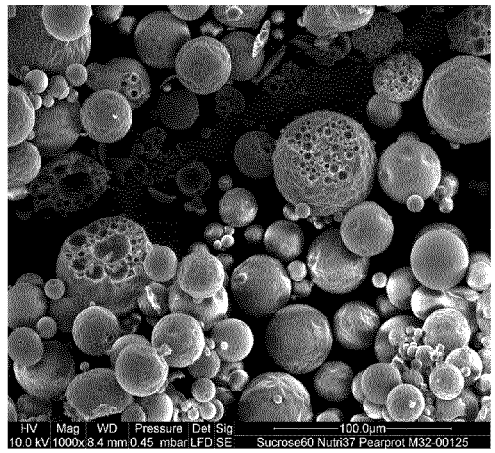
Figure 6:
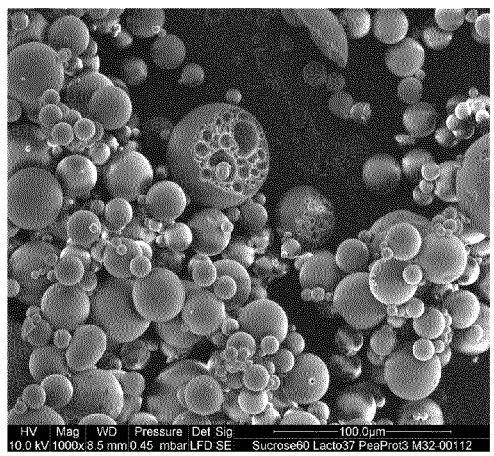
Figure 6:
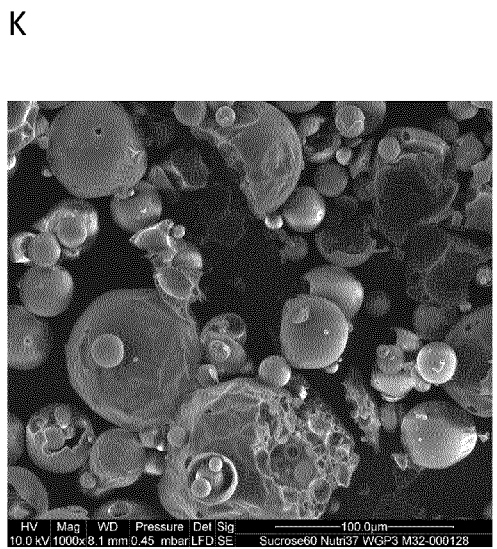
Figure 6:
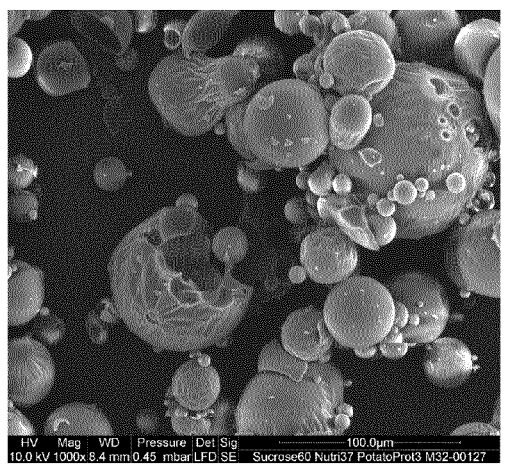

The microstructure of the particles was investigated by SEM analysis (FIG. 6). Samples can be distinguished by two main subgroups. First, we observe that particles containing sodium caseinate and pea protein have a comparable structure. Particle size is between 5-70 microns. They are highly aerated, of which we observe mainly small bubbles or air channels of approximatively 5-10 microns. Open porosity, defined by the presence of aeration on the external surface of the particles, is only limited.

The other subgroup comprise particles containing wheat gluten protein and potato protein. Open porosity is slightly higher, due to thinner particle walls. Internal porosity show larger bubbles or air channels and is, comparatively, much more chaotic. The observed particle size is also larger, with particles up to 100 microns being observed.

Example 7

Preparation of the Amorphous Porous Particles with Plant Milks

Plant milks were combined with maltodextrin (DE12-20) and sucrose so that, on a solids basis there was 5% plant milk, 35% maltodextrin and 60% sucrose. The mixtures were made up with water at a total solids level of 50% and spray dried with gas injection as in Example 1. All variants are successfully produced with a throughput of 10-12 L/h.

Physical and chemical characterization of the powders was performed. Results of moisture, glass transition and water activity are presented below.

|   |   | Moisture [%] | $T_g$ [° C.] | $a_w$ [—] |
|---|---|---|---|---|
| N | 60% Sucrose, 35% maltodextrin, 5% Spelt milk | 3.26 | 45.4 | 0.168 |
| O | 60% Sucrose, 35% maltodextrin, 5% Coconut milk | 3.03 | 47.3 | 0.166 |
| P | 60% Sucrose, 35% maltodextrin, 5% Oat milk | 3.45 | 42.1 | 0.194 |
| Q | 60% Sucrose, 35% maltodextrin, 5% Almond milk | 3.22 | 45.6 | 0.177 |
| R | 60% Sucrose, 35% maltodextrin, 5% Rice milk | 3.40 | 43.2 | 0.187 |
| S | 60% Sucrose, 35% maltodextrin, 5% Soya milk | 3.68 | 42.0 | 0.203 |

Results of particle properties are shown below.

Changing the plant milk type leads to changes in porosity. All the variants were highly aerated and had a closed porosity greater than 35%.

|   |   | Apparent density [—] | Porosity [%] | D90 [μm] |
|---|---|---|---|---|
| N | 60% Sucrose, 35% maltodextrin, 5% Spelt milk | 0.866 | 45.20 | 89.6 |
| O | 60% Sucrose, 35% maltodextrin, 5% Coconut milk | 0.845 | 46.55 | 335.9 |
| P | 60% Sucrose, 35% maltodextrin, 5% Oat milk | 0.956 | 39.51 | 256.4 |
| Q | 60% Sucrose, 35% maltodextrin, 5% Almond milk | 0.980 | 38.02 | 75.1 |
| R | 60% Sucrose, 35% maltodextrin, 5% Rice milk | 0.974 | 38.41 | 884.4 |
| S | 60% Sucrose, 35% maltodextrin, 5% Soya milk | 0.747 | 52.73 | 81.6 |

Figure 7:
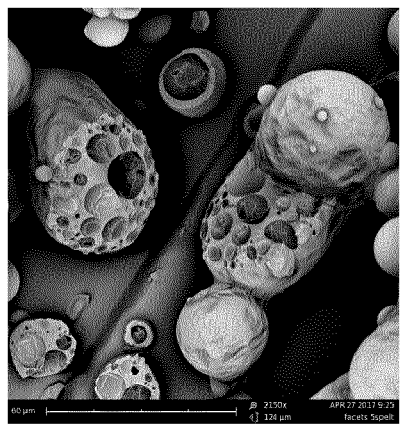
FIG. 7 shows scanning electron micrographs of porous amorphous powders with sucrose, maltodextrin, and N: spelt milk, O: coconut milk, P: oat milk, Q: almond milk, R: rice milk and S: soya milk.
Figure 7:
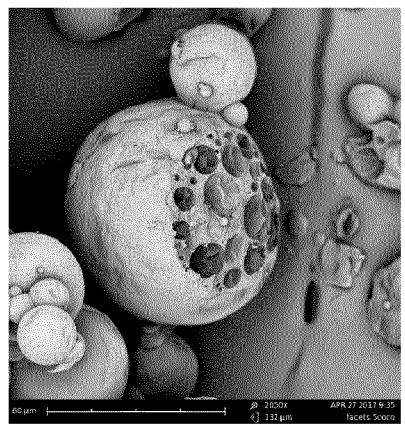
Figure 7:
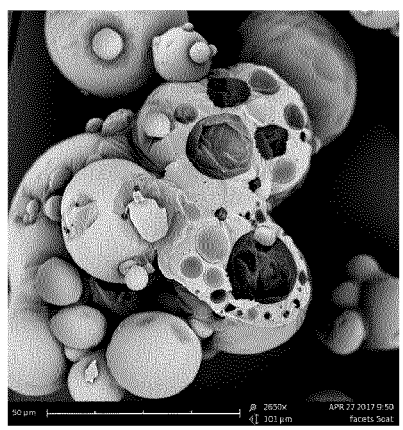
Figure 7:
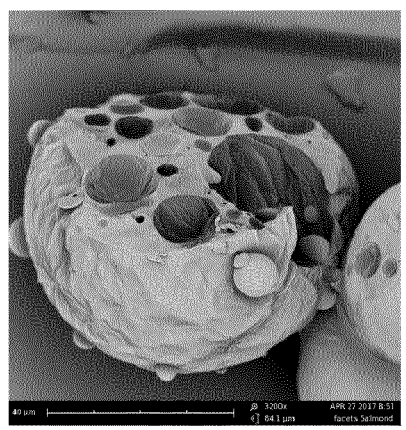
Figure 7:
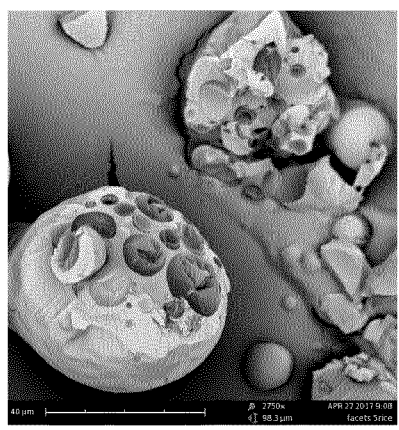
Figure 7:
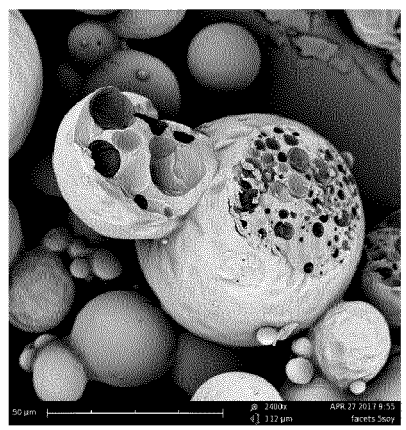

The microstructure of the particles was investigated by SEM analysis (FIG. 7). In terms of microstructure, they are all comparable. Particles size is in the order of magnitude of 70 microns, but their distribution is relatively poly-dispersed. Importantly, we observe that some powders are quite aggregated, which influences the D90 laser scattering measurements. Aeration is observed with several air bubbles or channels per particle, with a size of around 10 microns.

Example 8

Kinetics of Dissolution

Figure 8:
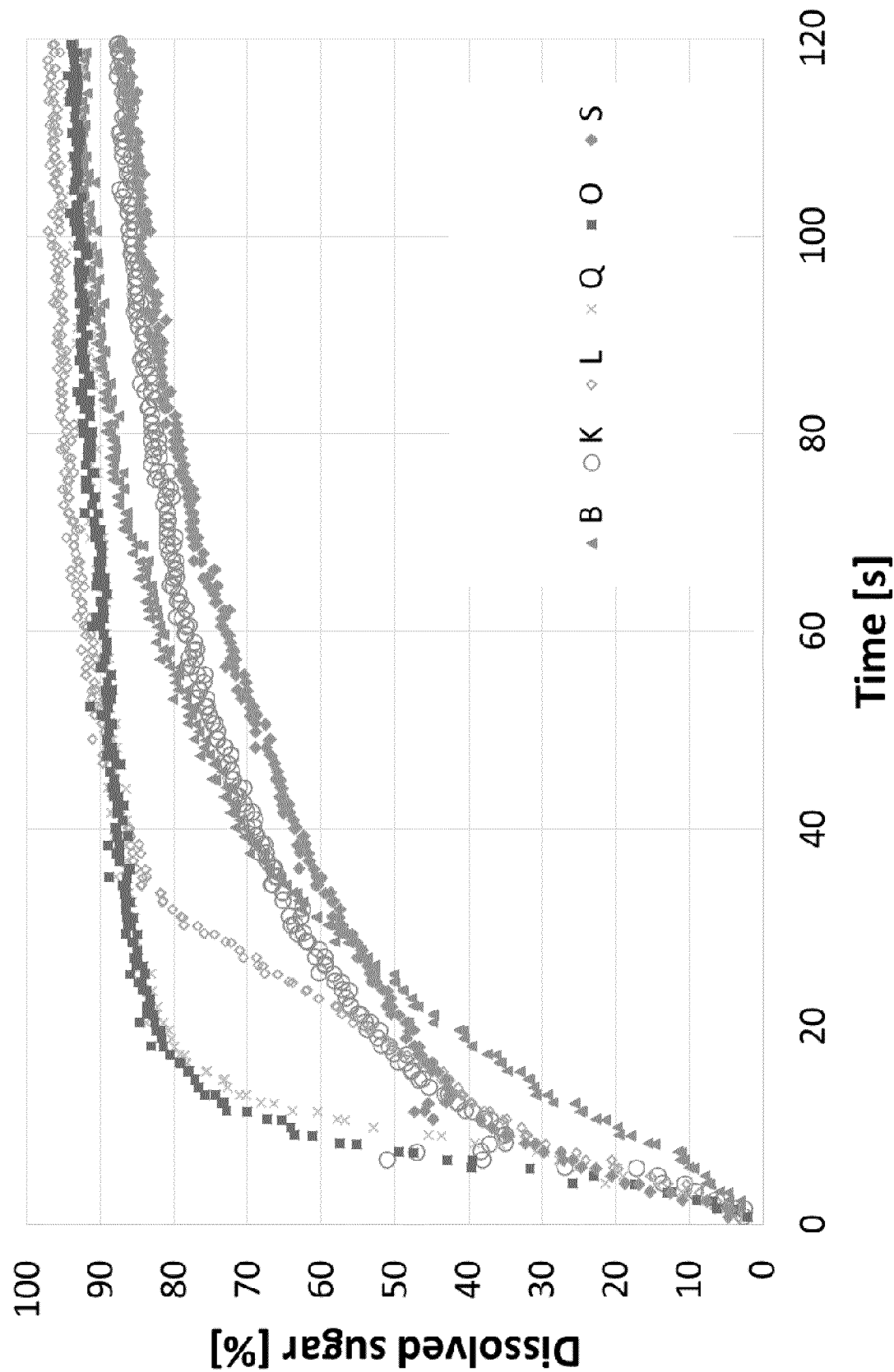
FIG. 8 shows the dissolution rates of porous amorphous powders. Sucrose and skimmed milk (B), lactose and pea (K), Nutriose® and wheat gluten (L), maltodextrin and almond milk (Q), maltodextrin and coconut milk (O) and maltodextrin and soya milk (S).

The kinetics of dissolution of five of the amorphous porous powders was measured and compared to that of a porous amorphous powder manufactured in the same manner, but with 60% sucrose and 40% skimmed milk (bovine) on a solids basis (B). The samples assessed were lactose and pea (K), Nutriose® and wheat gluten (L), maltodextrin and almond milk (Q), maltodextrin and coconut milk (O) and maltodextrin and soya milk (S). The results are plotted in FIG. 8. The powder with sucrose, almond milk and maltodextrin has a much faster dissolution that that of sucrose and skimmed milk. Both powders having a similar particle size. Faster dissolution of sweet tasting materials has been shown to correlate with increased sweetness perception.

Example 9

Wettability Measurements

Contact angle measurements are performed in order to assess the wetting properties of the porous amorphous powders prepared with sucrose, maltodextrin and plant milks (samples N, O, P, Q, R, S) compared to a porous amorphous powder made from sucrose and skimmed milk (B). All the plant milk samples were found to be completely wetting (0° contact angle), whereas the porous amorphous powder with skimmed milk powder (SMP) presents a good wetting but is not completely wetting, with contact angle of 10°. This provides an indication that the plant milk samples have better wetting properties than the SMP sample, but it should be noted that wettability on a powder bed is dependent on the particle size and the roughness of the powder. Also, the amount of proteins is not equal between the variants.

In order to eliminate the influence of particle shape and amount of proteins, contact angle measurements were performed on thin films layers of 20% protein solutions. The values in the table below are the averages of 4 experiments.

| Sodium caseinate | Pea protein | Potato protein | Wheat gluten protein |
|---|---|---|---|
| 68.1° ± 3.0° | 57.3° ± 1.6° | 37.7° ± 1.6° | 8.9° ± 1.8° |

It can be observed that pure dissolved pea, potato and wheat gluten proteins have better wetting than sodium caseinate. Improved wetting of a powder may lead to an improved mouthfeel when it is part of a foodstuff, especially when the powder is present at high levels.

Example 10

Aeration of Fat Based Compositions Comprising Amorphous Aerated Sugar Particles

Aerated spreads were prepared at different fat contents for fixed volumes; recipe T at around 45 g fat for 93.5 mL, and recipe U at around 30 g fat for 84.8 mL. The recipes either contained crystalline sucrose (recipes T1 and U1) or porous particles comprising an amorphous continuous phase (recipes T2 and U2). Although these materials are of a consistency making them suitable for use as spreads, they could also be used as particularly soft fillings. The porous particles comprising an amorphous continuous phase are referred to as amorphous porous sugar in the rest of the example. The amorphous porous sugar had a ratio of sucrose to skimmed milk powder of 60:40 and had a closed porosity of 58%.

It is worth mentioning here that as amorphous porous sugar is aerated and as the crystalline sugar is replaced by aerated sugar on a volume basis, recipes comprising amorphous sugar are expected to show lower volume density due to porosity. Thus, for the sake of comparison, in the examples reported herein, all the ingredient compositions for recipes comprising amorphous porous sugar are expressed in wt. % based on the reference composition weight (with crystalline sucrose) for a similar volume.

In addition, as amorphous porous sugar particles contain already skimmed milk powder in their composition, the quantity of skimmed milk powder added in the spread recipes has been adjusted in order to produce comparable recipes with crystalline sugar and with amorphous porous sugar having comparable composition in term of skimmed milk, fat and lecithin contents, considering identical spread volumes.

The spread recipes are reported in the table below.

At first, the dry ingredients were mixed with part of the fat blend, followed by refining (using a 3-roll refiner). The amorphous porous sugar was not refined and was directly added to the pre-refined mass along with the residual fat and the lecithin. The final composition mixture was blended in a Stephan mixer at 50° C. before application.

Recipes comprising amorphous porous sugar, noted 2, were expected to show lower volume densities (which are expressed by the decrease of the total weight and the increase of the porosity values in the table below). Hence, considering identical coating volumes, Recipes T1 and T2 and Recipes U1 and U2 have similar skimmed milk, fat and lecithin contents.

Volume density was calculated by measuring the weight of the samples in standardized 3 cL plastic cups. The volume density is the average of triplicates.

The initial porosity ($\phi_s$) provided by amorphous porous sugar was calculated by using the volume density ($\rho$) of the reference compositions and the one of the composition comprising amorphous porous sugar. As an example, the porosity of recipe containing amorphous porous sugar was calculated as shown in the equation below:

$$\phi_s(2) = 1 - \frac{\rho(2)}{\rho(1)}$$

|  |  | T1 | T2 | U1 | U2 |
|---|---|---|---|---|---|
| Ingredients (g) | Sugar (sucrose) | 40.0 | 0.0 | 50.9 | 0.0 |
|  | Skim milk powder | 15.0 | 5.8 | 19.1 | 7.0 |
|  | Shea Stearin | 9.8 | 9.9 | 6.5 | 6.2 |
|  | Palm Olein | 22.3 | 22.5 | 14.8 | 14.1 |
|  | Rapeseed oil | 12.5 | 12.6 | 8.3 | 7.9 |
|  | Sunflower Lecithin | 0.5 | 0.5 | 0.5 | 0.5 |
|  | Amorphous porous sugar | 0.0 | 23.4 | 0.0 | 28.1 |
|  | Density (g/mL) | 1.07 | 0.80 | 1.18 | 0.75 |
|  | Total weight (g) | 100.0 | 74.8 | 100.0 | 63.7 |
|  | Volume (mL) | 93.5 | 93.5 | 84.8 | 84.8 |
|  | Porosity, $\phi_S$ (%) | 0 | 25 | 0 | 36 |
|  | Fat content (g) | 45.2 | 45.7 | 30.2 | 28.8 |
|  | Total Skim milk powder | 15.0 | 15.2 | 19.1 | 18.2 |

A Megatron MT-FM30 (Kinematica AG) aeration unit coupled with an IKA screw pump was used to aerate the spread compositions to mimic an industrial aeration system following the setting parameters presented in the table below.

| Feed tank temperature (° C.) | 30-35 |
|---|---|
| Screw-pump flow (g/min) | 10-13 |
| Pipe jacket temperature (° C.) | 10-12 |
| $N_2$ flowrate (mL/min) | 15-25 |
| Rotor speed (rpm) | 600-1000 |
| Aeration head temperature (° C.) | 19-20 |
| Outlet product temperature (° C.) | 23-25 |

The levels of aeration obtained after aeration have been characterized by porosity ($\phi$) estimations based on volume density ($\rho$) measurements in standardized 3 cL plastic cups and are reported in the table below.

The porosity, $\phi_F$, due to the aeration of the fat phase of the composition through the aeration unit was calculated as shown in the equation below:

$$\phi_F = 1 - \frac{\rho_{aerated}}{\rho_{initial}}$$

The total porosity after aeration, $\phi_T$, taking into account both the porosity due to amorphous porous sugar particle and aeration of the fat phase was calculated as shown in the equation below:

$$\phi_T(1) = \phi_F(1)$$

or $$\phi_T(2) = 1 - \frac{\rho_{aerated}(2)}{\rho_{initial}(1)}$$

|  | T1 | T2 | U1 | U2 |
| --- | --- | --- | --- | --- |
| Density initial (g/mL) | 1.07 | 0.80 | 1.18 | 0.75 |
| Density after aeration (g/mL) | 0.48 | 0.38 | 0.77 | 0.29 |
| Initial Porosity, $\phi_S$ (%) | 0 | 25 | 0 | 36 |
| Porosity due to aeration of the fat phase, $\phi_F$ (%) | 56 | 52 | 35 | 61 |
| Total porosity after aeration, $\phi_T$ (%) | 56 | 64 | 35 | 75 |

As can be noticed, much higher levels of total porosity could be achieved with composition comprising amorphous porous sugar particles. This increase can be attributed to two contributions, first the porosity brought by the amorphous porous sugar itself but second and surprisingly by a better aeration of the fat phase during the aeration process. The latter being well illustrated by the evolution of $\phi_F$ especially for lower fat content variants (Recipes U).

The invention claimed is:

1. A food composition having a soft texture at 20° C., the food composition comprising a dispersion of porous particles in a continuous fat phase,
    wherein the porous particles comprise an amorphous continuous phase, the porous particles comprising a sweetener and a bulking agent, the soft texture of the food composition is such that the food composition exhibits a maximum penetration force of less than 1500 g at 20° C., the amorphous continuous phase of the porous particles comprises sucrose and skimmed milk, and the sucrose is at least 30 wt. % of the porous particles.

2. The food composition according to claim 1, wherein the porous particles have a closed porosity of between 10 and 80%.

3. The food composition according to claim 1, wherein the porous particles have been refined.

4. The food composition according to claim 1, wherein the continuous fat phase comprises
    between 2 and 30 wt. % of a high-melting fat selected from the group consisting of stearin or mid-fractions of shea butter, kokum butter, sal butter, cocoa butter, palm oil, algal oil and combinations thereof; and
    between 70 and 98 wt. % of a low-melting fat selected from the group consisting of high oleic sunflower oil, high oleic safflower oil, high oleic soybean oil, high oleic rapeseed oil such as high oleic canola oil, high oleic algal oil, olive oil, macadamia nut oil, hazelnut oil, avocado oil, sunflower oil, rapeseed oil, soybean oil, grape-seed oil, cotton-seed oil, corn oil and combinations thereof.

5. The food composition according to claim 1, wherein the continuous fat phase is aerated.

6. The food composition according to claim 5, wherein the continuous fat phase comprises
    a high-melting fat having a melting point between 35° C. and 80° C.,
    a medium-melting fat having a melting point between 15° C. and 30° C., and
    a low-melting fat having a melting point between −50° C. and 5° C.

7. The food composition according to claim 1, wherein the amorphous continuous phase of the porous particles comprises partially aggregated proteins.

8. The food composition according to claim 1 further comprising hazelnuts and/or cocoa.

9. The food composition according to claim 1, wherein the food composition is a confectionery filling or a spread.

10. A spread comprising porous particles comprising an amorphous continuous phase comprising sucrose and skimmed milk, and the sucrose is at least 30 wt. % of the porous particles,
    the spread having the same sweetness as a control spread having a sucrose content between 40 and 65 wt. %, wherein a sucrose content of the spread is at least 20% less than the sucrose content of the control, and the spread contains no mono, di or tri -saccharides apart from sucrose or lactose and no sugar alcohols or high intensity sweeteners.

11. The spread according to claim 10, wherein the spread has a continuous fat phase and further comprises cocoa and hazelnuts.

12. A process for manufacturing a food composition having a soft texture at 20° C., the soft texture of the food composition being such that the food compositions exhibits a maximum penetration force of less than 1500 g at 20° C., the process comprising:
    a) subjecting a mixture comprising a sweetener and a bulking agent to a high pressure;
    b) adding gas to the mixture;
    c) drying the mixture to form porous particles comprising an amorphous continuous phase comprising sucrose and skimmed milk, and the sucrose is at least 30 wt. % of the porous particles; and
    d) mixing the porous particles with fat to produce a mix.

13. The process according to claim 12, wherein the mix produced in step d is refined.

14. The process according to claim 12, wherein in step d, the porous particles are further mixed with an ingredient selected from the group consisting of milk powder, crystalline sucrose, hazelnuts and combinations thereof.

15. The food composition according to claim 1, wherein the food composition comprises soluble fiber, and a ratio of the sucrose to the soluble fiber is between 0.5:1 and 2.5:1 on a dry weight basis.

16. The spread according to claim 10, wherein the spread comprises soluble fiber, and a ratio of the sucrose to the soluble fiber is between 0.5:1 and 2.5:1 on a dry weight basis.

17. The process according to claim 12, wherein the food composition comprises soluble fiber, and a ratio of the sucrose to the soluble fiber is between 0.5:1 and 2.5:1 on a dry weight basis.

* * * * *